US007123612B2

(12) United States Patent
Lu

(10) Patent No.: US 7,123,612 B2
(45) Date of Patent: Oct. 17, 2006

(54) WIDTH UPGRADE FOR A SCALABLE SWITCHING NETWORK

(76) Inventor: Haw-minn Lu, 10733 Calston Way, San Diego, CA (US) 92126

( * ) Notice: Subject to any disclaimer, the term of this patent is extended or adjusted under 35 U.S.C. 154(b) by 1012 days.

(21) Appl. No.: 10/074,174

(22) Filed: Feb. 10, 2002

(65) Prior Publication Data

US 2003/0163754 A1    Aug. 28, 2003

(51) Int. Cl.
  *H04L 12/28* (2006.01)
(52) U.S. Cl. .................... 370/388; 370/392; 370/396; 370/351
(58) Field of Classification Search ............... 370/388, 370/254, 367, 370, 371, 372, 373, 384, 386, 370/387, 400, 389
See application file for complete search history.

(56) References Cited

U.S. PATENT DOCUMENTS

| 5,841,775 | A | 11/1998 | Huang |
| 6,049,542 | A | 4/2000 | Prasad |
| 6,901,071 | B1 * | 5/2005 | Lu ............................ 370/388 |
| 2003/0002437 | A1 | 1/2003 | Lu |
| 2003/0152071 | A1 | 8/2003 | Lu |

OTHER PUBLICATIONS

Agrawal, "Testing and Fault-Tolerance of Multistage Interconnection Networks," Computer, Apr. 1982, pp. 41-53, vol. 15, No. 4, IEEE, US.
Bhuyan, et. al "Design and Performance of Generalized Interconnection Networks." IEEE Transactions on Computers, Dec. 1983, pp. 1081-1090, vol. 32, No. 12, IEEE, US.
Blake, et. al "Multistage Interconnection Network Reliability," IEEE Transactions on Computers, Nov. 1989, pp. 1600-1603, vol. 38, No. 11, IEEE, US.
Chin, et. al "Packet Switching Networks for Multiprocessors and Data Flow Computers," IEEE Transactions on Computers, Nov. 1984, pp. 991-1003, vol. 33, No. 11, IEEE, US.
Kumar, et. al "Failure Dependent Performance Analysis of a Fault-Tolerant Multistage Interconnection Network," IEEE Transactions on Computers, Dec. 1989, pp. 1703-1713, vol. 38, No. 12, IEEE, US.
Tzeng, et. al "Realizing Fault-Tolerant Interconnection Network via Chaining," IEEE Transactions on Computers, Apr. 1988, pp. 458-462, vol. 37. No. 4, IEEE, US.
Varma, et. al "Fault-Tolerant Routing in Multistage Interconnection Networks," IEEE Transactions on Computers, Mar. 1989, pp. 385-393, vol. 38, No. 3, IEEE, US.
Cizek, et al. "Tradeoff Between Cost and Reliability in Packet Switching MultiStage Interconnection Networks," AFRICON '92 Proceedings., 3rd AFRICON Conference, Sep. 22-24, 1992, pp. 365-368, IEEE, South Africa (Reprinted US).

* cited by examiner

Primary Examiner—Hanh Nguyen

(57) ABSTRACT

A redundant multistage network can be expanded by width in a non-stop manner, involving an insertion, a reconfiguring and an activation section. The insertion section involves adding a router to each row of routers in a position dictated by the specific upgrade procedure. The reconfiguring section involves the selection of a port and disconnecting any connections necessary to connect that port with its proper corresponding port as derived from the final desired topology. This section can further include the optional permutation of port address to minimize traffic disruption. The activation section involves attaching any new external ports desired to external sources and putting those new connections into service.

21 Claims, 31 Drawing Sheets

```
//
//Procedure Upgrade
//    Performs a width upgrade of a network, with num_rows total rows.
//    "want to relabel" may be "true" or "false" each time the statement is reached
//
Procedure Upgrade
for(current_row=0;current_row<num_rows;current_row++) {
        insert R(current_row, N) in position insertion_position(current_row);
        if(current_row>1) {
                if(R(current_row-1,N) should be connected to R(current_row,N))
                        Connect R(current_row-1,N) to R(current_row,N);
        }
}
do {
start:
        if(want to relabel) {
                if(any router, current_router, can be relabeled) {
                        relabel_ports(current_router);
                        goto start;
                }
        }
        select any port not connected to corresponding_port(port);
        target_port=corresponding_port(port);
        if(target_port is already connected) {
                disconnected_port=port currently connected to target_port;
                Disconnect(target_port,disconnected_port);
        }
        Connect(port,target_port);
} while(there are misconnected ports);
connect_external_ports();
activate_external_ports();
```

Fig. 9A

```
//
//Procedure Upgrade
//    Performs a width upgrade of an RCCBG network with a fanout of fanout,
//    num_routers_per_row per row prior to width upgrade,and num_rows total rows.Also,
//    RELABEL_AVAILABLE flag if swapping of ports in a single router can be performed without
//    breaking connections.
//
Procedure Upgrade
for(current_row=0;current_row<num_rows;current_row++) {
    insert R(current_row, N) in position insertion_position(current_row);
    if(current_row>1) {
        if(R(current_row-1,N) should be connected to R(current_row,N))
            Connect R(current_row-1,N) to R(current_row,N);
    }
} for(rindex=0;rindex<num_rows-1;rindex++) {
    current_row=row_select(rindex);
    if(RELABEL_AVAILABLE) {
        relabel_ports(current_row);
    }
    disconnected_port=None; // Holds the port previously disconnected by the last rewire step
    while((port=select_port(disconnected_port,current_row))!=None) {
        target_port=corresponding_port(port);
        if(target_port is already connected) {
            disconnected_port=port currently connected to target_port;
            Disconnect(target_port,disconnected_port);
        }
        Connect(port,target_port);
    }
connect_external_ports();
activate_external_ports();
```

Fig. 9B

```
//
//Simplification functions.
//
Function correct_port(port1,port2)
{
    if(port1 can be properly connect to port2)return(TRUE);
    else return(FALSE);
}
Function corresponding_port(port)
{
    if(port is a bottom port) {
        return top port of router in next row that should be properly connected to port port;
    } else {
        return bottom port of router in the previous row that should be properly connected to port port;
    }
}
Function Disconnect(port1,port2)
{
    Divert traffic away from port1 ;
    Divert traffic away from port2 ;
    Disconnect connection between port1 and port2 ;
}
Function Connect(port1,port2)
{
    Connect port1 and port2 ;
    Allow traffic to flow through port1 ;
    Allow traffic to flow through port2 ;
}
```

Fig. 9C

```
Function insertion_position(row)  // Add a column version
{
        return(number_of_routers_per_row+1);
}

Function insertion_position(row)  // For Fig.3B
{
        switch(row) {
        case 0:
                return 4;
        case 1:
                return 4;
        case 2:
                return 3;
        case 3:
                return 0;
        }
}
Function insertion_position(row)  // For Fig.3C
{
        switch(row) {
        case 0:
                return 1;
        case 1:
                return 4;
        case 2:
                return 3;
        case 3:
                return 1;
        }
}
```

Fig. 10

```
Function row_select(row_index) {
    if(num_rows is even) {
        start_row=num_rows/2-1;
    } else {
        start_row=(num_rows-1)/2;
    }
    if(row_index is even) {
        return(start_row+row_index/2);
    } else {
        return(start_row-(row_index+1)/2);
    }
}
```

Fig. 11A

```
Function row_select(row_index) {
    return(row_index);
}
```

Fig. 11B

```
Function select_port(dport,current_row) // optimal dport is not used
{
    port_pool={port: bottom ports of routers in row, current_row and top port of routers in row,
            current_row+1 not connected to corresponding_port(port)};
    // For simplicity order right to left
    // First criterion
    for port in port_pool {
        if(disconnected(port) && disconnected(corresponding_port(port))return(port);
    }
    // Second criterion:This basically says we prefer to target connections that break
    // connections only on fully populated routers
    for port in port_pool {
        if(disconnected(port) &&
            num_disconnections(router_of(port_connected_to(corresponding_port(port))=0))) {
            return(port);
        }
    }
    // Third criterion:Any port that is not connected
    for port in port_pool {
        if(disconnected(port)) return(port);
    }
    // Catch all for any ports left over:Not likely to be needed
    for port in port_pool {
        return(port);
    }
    return(None);
}
```

Fig. 12A

```
Function select_port(dport,row) //fill the hole
{
    if(dport !=None)return(dport);
    else {
        for all bottom ports, port, of routers in row current_row scanning from right to left {
            if(port is not connected to corresponding_port(port)) return(port);
        }
        return None; // No more ports to rewire
    }
}
```

Fig. 12B

```
Function select_port(dport,current_row) // round robin
{
    // This requires a FIFO of ports
    if(port_fifo empty) {
        port_fifo={port: bottom ports of routers in row, current_row and top port of routers in row,
            current_row+1 which are disconnected};
    if(port_pool empty) {
        port_pool={port: bottom ports of routers in row, current_row and top port of routers in row,
            current_row+1 not connected to corresponding_port(port)};
        for port in port_pool {
            return(port);
        }
        // Catch all for any ports left over:Not likely to be needed
        port=any port not connected to proper port
        if(port exists) {
            return(port);
        }else {
            return(None);
        }
    }
    port=top of port_fifo ;
    remove top of port_fifo ;
    return(port);
}
```

Fig. 12C

```
Function relabel_ports(current_row)
{
    for(i=0;i<routers_per_row;i++) {
        for(bport1=0;bport1<fanout;bport1++) {
            for(bport2=0;bport2<fanout;bport2++) {
                //Test to see if the candidate port is connected to a router which one of the
                //other ports on the same router should be connected to.It doesn't matter
                //at this point if it is the correct top port.That will be corrected in next loop.
                if(bottom port bport1 of R(current_row,i)is connected to any top port of
                    router_of(corresponding_port(bottom port bport2 of R(current_row, i)) {
                    if(bport1!=bport2) {
                        exchange_ports(bport1 of R(current_row, i),bport2 of R(current_row, i));
                    }
                }
            }
        }
    }
    for(tport1=0;tport1<fanout;tport1++) {
        for(tport2=0;tport2<fanout;tport2++) {
            //Test to see if the candidate port is connected to a port which one of the
            //other ports on the same router should be connected to.
            if(top port tport1 of R(current_row+1, i)is connected to
                corresponding_port(top port tport2 of R(current_row+1, i)) {
                if(tport1!=tport2) {
                    exchange_ports(tport1 of R(current_row+1, i),tport2 of R(current_row+1, i));
                }
            }
        }
    }
}
//
//Auxiliary Procedures
//
Function router_of(port)
{
    return(the router which port belongs to);
}
//
//Here logical relabelling is assumed possible
//Other exchange schemes can be substituted
//
Function exchange_ports(port1,port2)
{
    permanently divert traffic originally intended for port1 to port2 ;
    permanently divert traffic originally intended for port2 to port1 ;
}
```

WIDTH UPGRADE FOR A SCALABLE SWITCHING NETWORK

BACKGROUND

1. Field of Invention

This invention relates to redundant multistage switching networks, specifically to the non-stop addition of a new router to each row of such a network.

2. Discussion of Prior Art

When a multistage switching network such as a Banyan or Butterfly network is expanded by width a duplicate copy of itself must be added. In addition, adding a new row requires that half of the external connections have to be disconnected in the process. This leads to an interruption in service.

A Butterfly network, 10, is shown in FIG. 1 with top ports, 11, connected to external connections, 12, and bottom ports, 13, connected to external connections, 14. A duplicate of this network, 15, with top ports, 16, and bottom ports, 17. A new row, 18, with top ports, 19, and bottom ports, 20, are also shown.

In order to double number of external connections of the Butterfly network, 10, the connections between the top ports, 12, and external connections, 14, have to be broken and connected to the left half of new row bottom ports, 20, and the external connections, 14, connected to the left half of new row top ports, 19. To complete the upgrade, the duplicate network top ports, 16, are connected to the right half of new row bottom ports 17. At this point, duplicate network bottom ports, 17, and right half of new row top ports 19 would be available for new external connections.

The problem is that the connections between the original network top ports, 11, and external connections, 12, have to be disconnected in the process. This leads to an interruption in service.

Currently, special "hot slide" multiplexers are designed into switching centers to allow a new switching network to be installed in parallel and then switched in between clock cycles. Unfortunately, this physical electrical switch-over is only part of the problem. The new switch has to have exactly the same "control state" information as the old switch. This requires a considerable amount of hardware and software to accomplish correctly.

OBJECTS AND ADVANTAGES

Accordingly, the several objects and advantages of my invention are:

(a) to provide a procedure by which a redundant multistage switching network can be upgraded by expanding the number of routers per row without having to break an external connection; and (b) to provide a procedure by which a redundant multistage switching network can be upgraded by expanding the number of routers per row with a minimum loss in throughput bandwidth.

Further objects and advantages of our invention will become apparent from a consideration of the drawings and ensuing description.

DESCRIPTION OF DRAWINGS

FIG. 9A, FIG. 9B and FIG. 9C show the two algorithm for expanding the width of a compensated cyclic group multistage switching network, FIG. 9A shows the most general algorithm, while FIG. 9B shows a more specific algorithm.

FIG. 10 shows three different algorithms for selecting the insertions positions of new routers into each row. The results are mirrored in FIG. 3A, FIG. 3B and FIG. 3C.

FIG. 11A and FIG. 11B show two different algorithms for selecting the order the interconnections should be rewired.

FIG. 12A, FIG. 12B, and FIG. 12C show three different algorithms for selecting which port to rewire during the rewiring phase.

FIG. 13 shows an algorithm for relabeling ports to improve the efficiency of the upgrade process.

SUMMARY

Figure 1:
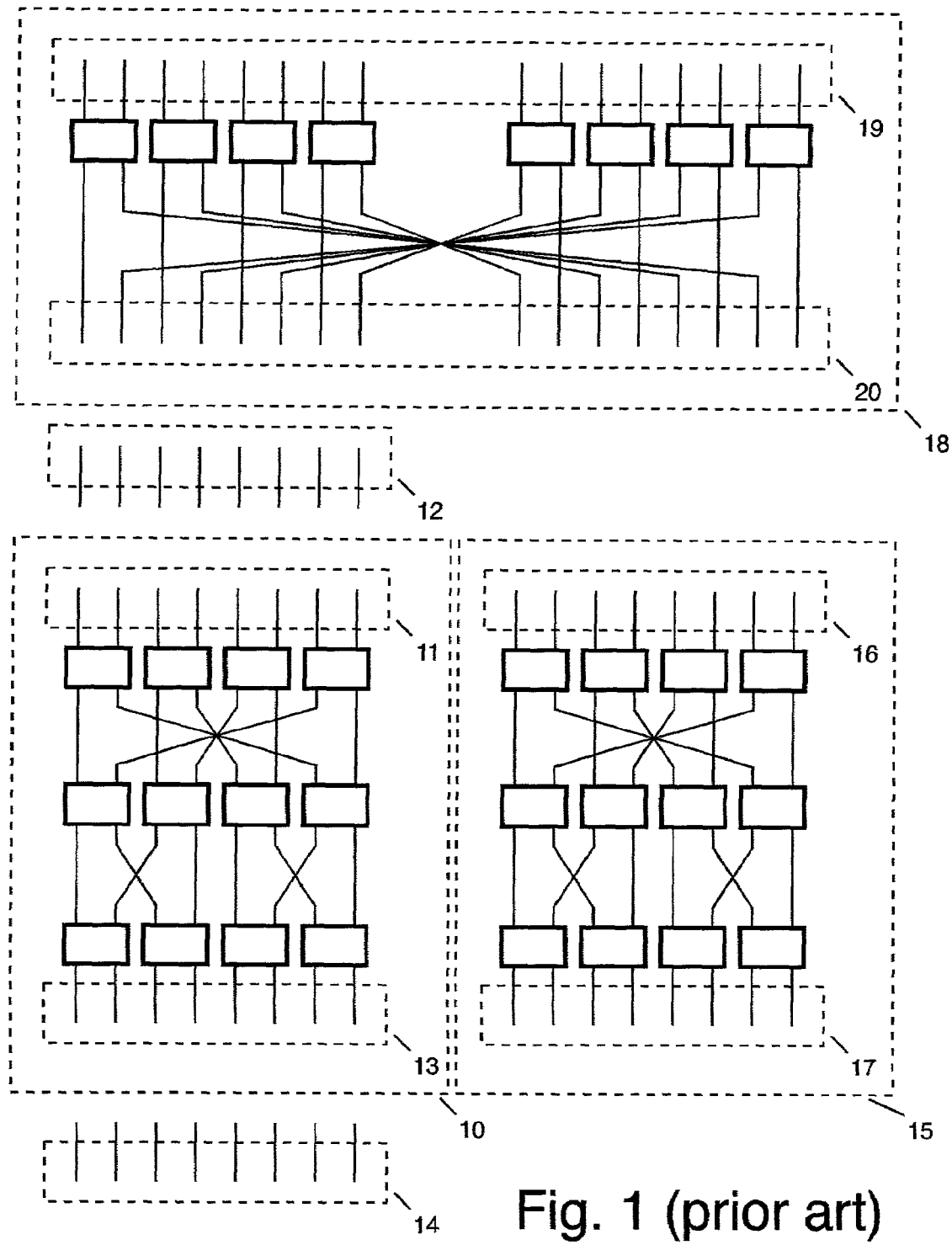
FIG. 1 shows a 16 port Butterfly multistage switching network being upgraded. (prior art)

A multistage switching network can expanded in width by adding new switching elements to the network without breaking any external connections.

If the switching elements are routers or have the ability to route traffic the expansion may be performed without severely disrupting its ability to route traffic provided that the network has adequate path redundancy.

The width augmentation process has three constituent components. The first component is the selection of the insertion points of the new routers into each row. The positions can be arbitrary, but it is best to insert them at the end of each row, since this minimizes the need to use the path redundancy to route traffic around an upgrade induced fault.

The second component has two types steps of which one is optional. The first type is to select a port that is misconnected in reference to the desired topology and to rewire it to its appropriate counterpart. The second type is optional and is the permutation of ports on the same router which results in a correct port being connected to the correct router. If such a permutation can be performed logically, traffic need not be disrupted. These two types of steps are repeated in any order until the desired topology is achieved. Since the ordering of such steps can be arbitrary, more structure can be added by breaking this component into three subcomponents.

The first subcomponent is the selection of the order in which each interconnection network is rewired into the desired topology. The order can be arbitrary, however, since the path redundancy is greatest in the middle of the network, the best order has been found to start with the middle row or the closest to the middle. The subsequent rows should be ordered with those closest to the middle first and those farthest away from the middle last.

The second subcomponent, which is optional, is the permutation of ports described above. This step should always be taken before rewiring an interconnection network, if such a permutation can be performed logically so that no traffic disruption occurs. This step minimizes bandwidth reduction during the rewiring of an interconnection network.

The third subcomponent is the rewiring phase. This is accomplished by systematically disconnecting from a selected port any misconnected connection to that port and to the corresponding port to which the selected port is to be connected. With any misconnections disconnected, the selected port and its appropriate corresponding port may then be connected. In order to minimize the impact on the throughput bandwidth, priority in the port selection process should be given to selecting ports not currently connected. This introduces a plethora of port selection algorithms. Additional preferences, contribute to better throughput bandwidth during the upgrade process.

The final component is relatively simple. All external connections that are not already connected should be connected and placed into service.

DESCRIPTION OF INVENTION

Figure 2:
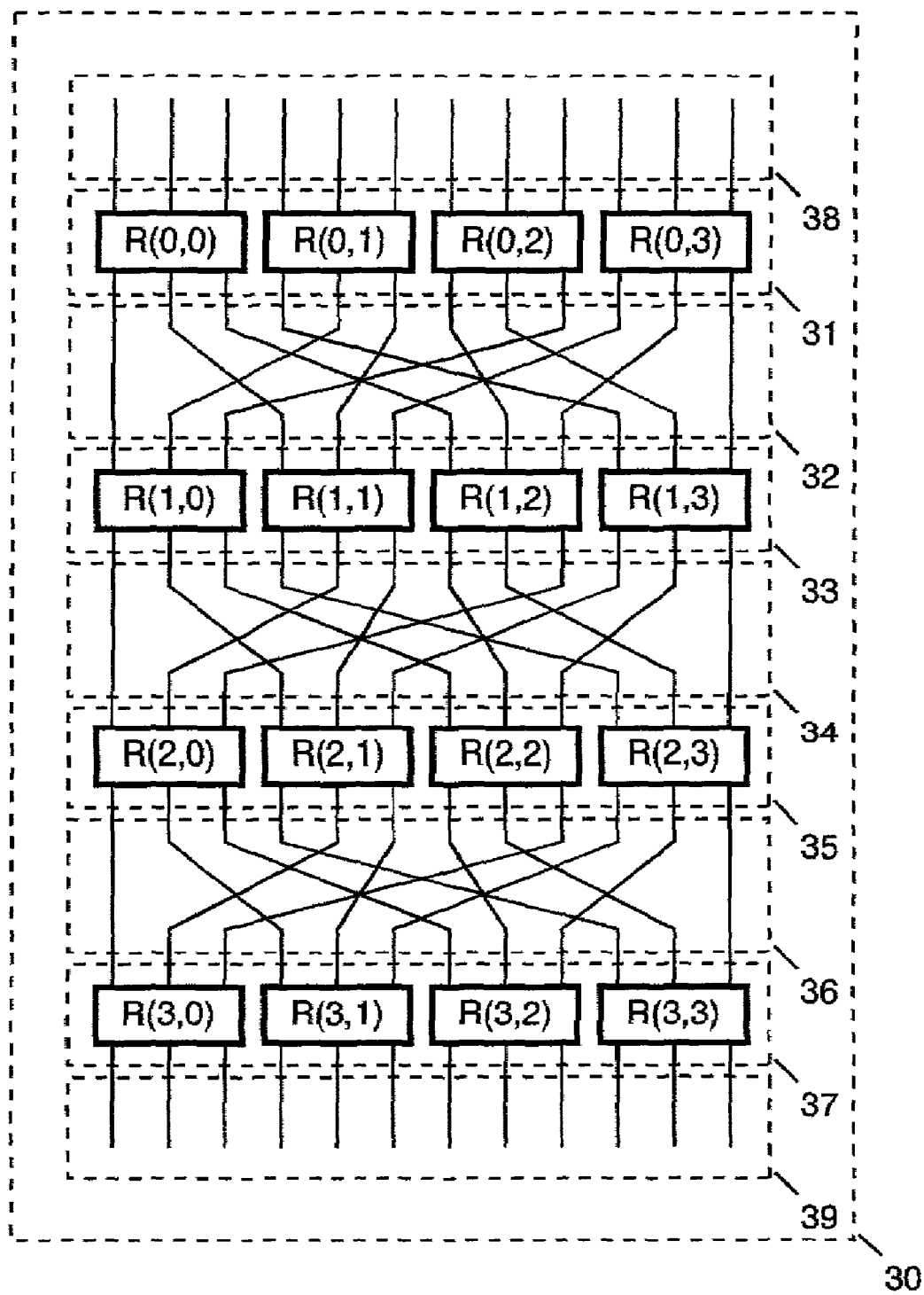
FIG. 2 shows a 24 port redundant blocking compensated cyclic group (RBCCG) multistage switching network. (prior art)

A redundant blocking compensated cyclic group (RBCCG) multistage network, 30, is shown in FIG. 2 and discussed further in U.S. Pat. No. 5,841,775, "Scalable Switching Networks" by Alan Huang, Nov. 24, 1998. It consists of rows, 31, 33, 35, and 37 of routers or other switching elements. These rows of routers are connected together via interconnection networks 32, 34, and 36. The routers are designed R(row, column) where the top left most router is denoted R(0,0). The top ports of each router are numbered from left to right starting with 0. The bottom ports of each router are numbered from left to right starting with 0. The top ports of each interconnection network are numbered from left to right starting with 0. The bottom ports of each interconnection network are numbered from left to right starting with 0.

Figure 3A:
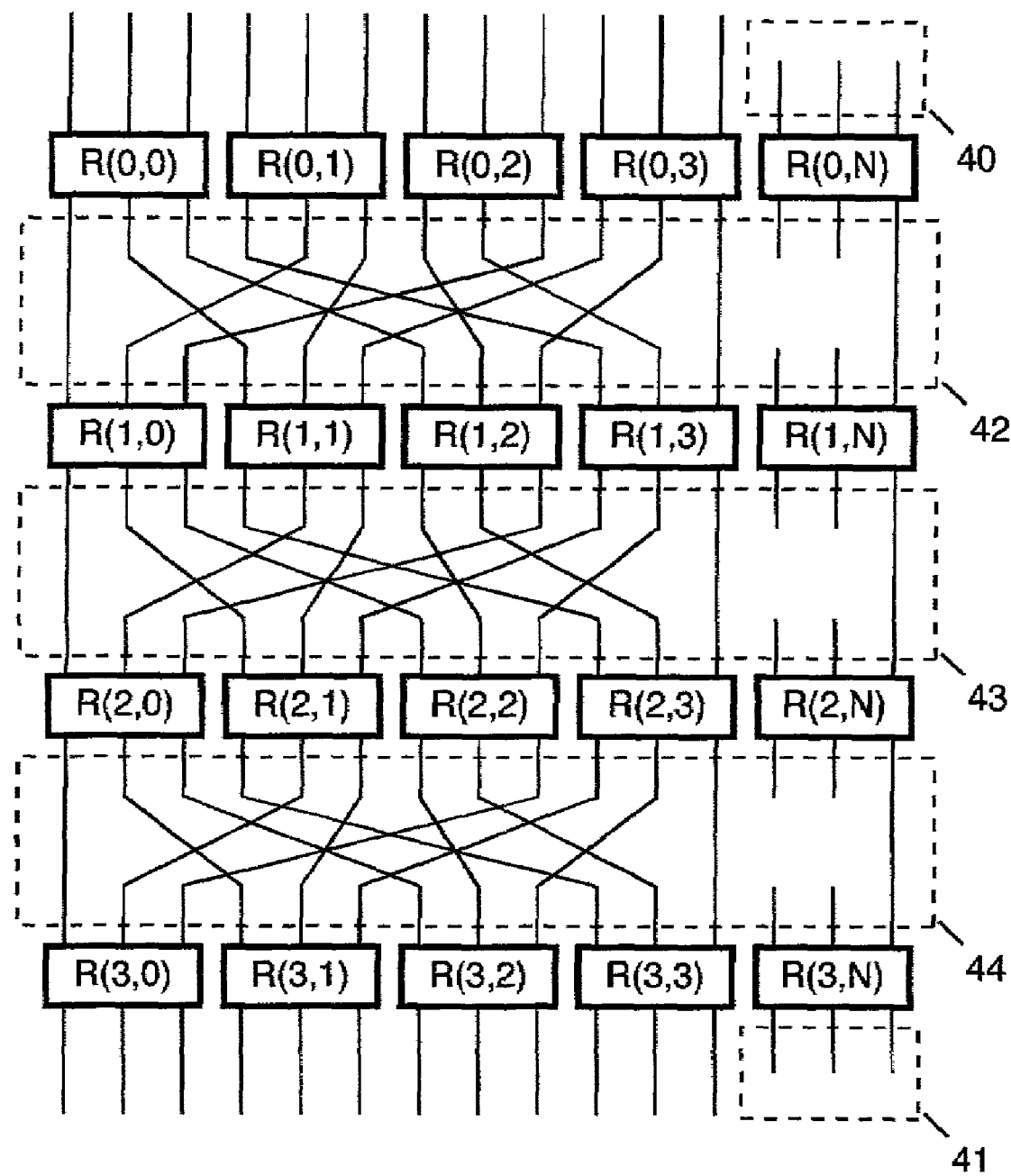
FIG. 3A shows a 24 port redundant blocking compensated cyclic group multistage switching network expanded to a 30 port switching network by inserting a new column. The new routers are connected together prior to the insertion.
Figure 3B:
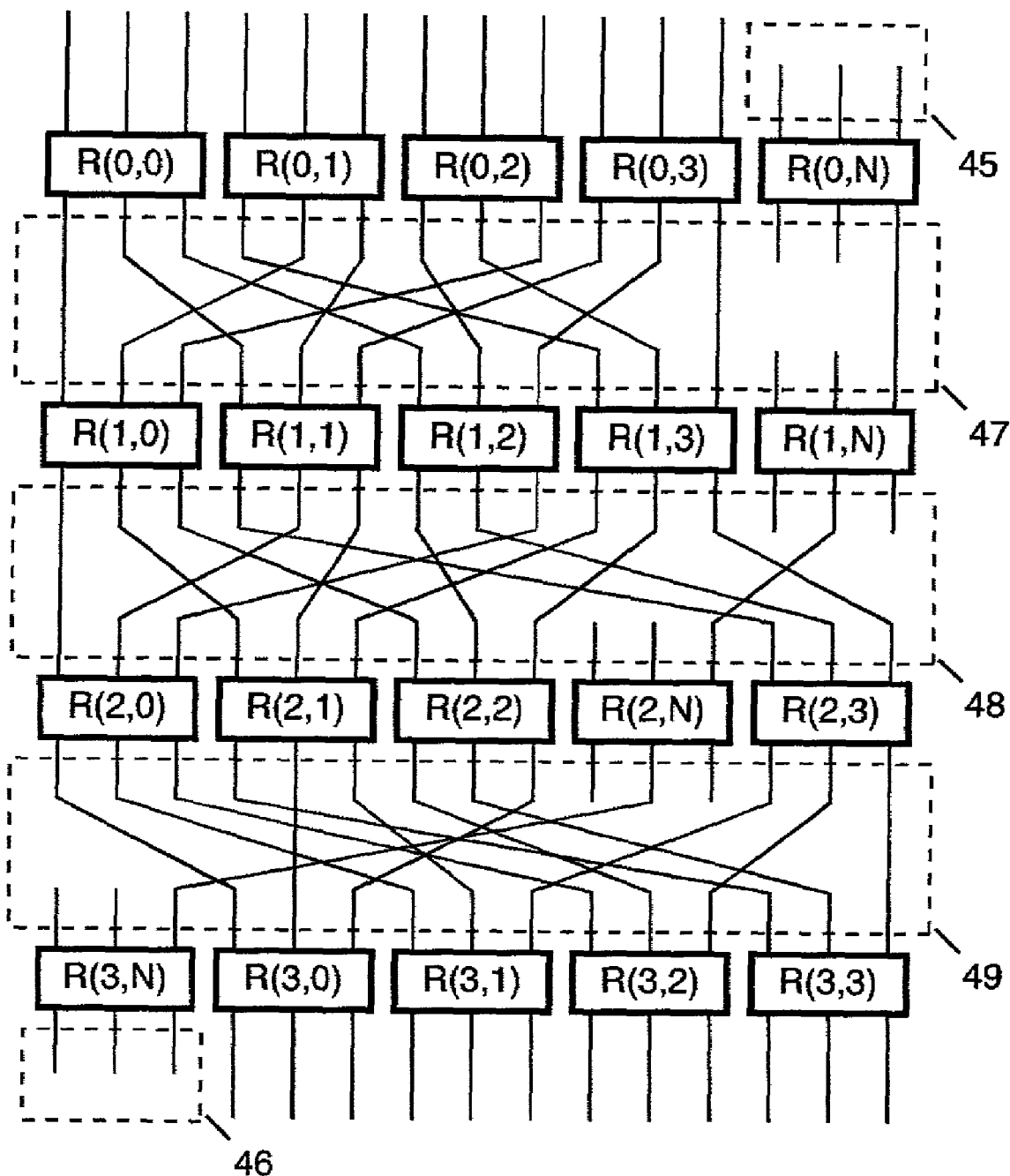
FIG. 3B shows a 24 port RBCCG multistage switching network expanded to a 30 port switching network by inserting a router after R(0,3) in row 0, after R(1,3) in row 1, between R(2,2) and R(2,3) in row 2, and before R(3,0) in row 3. The new routers are connected together prior to the insertion.
Figure 3C:
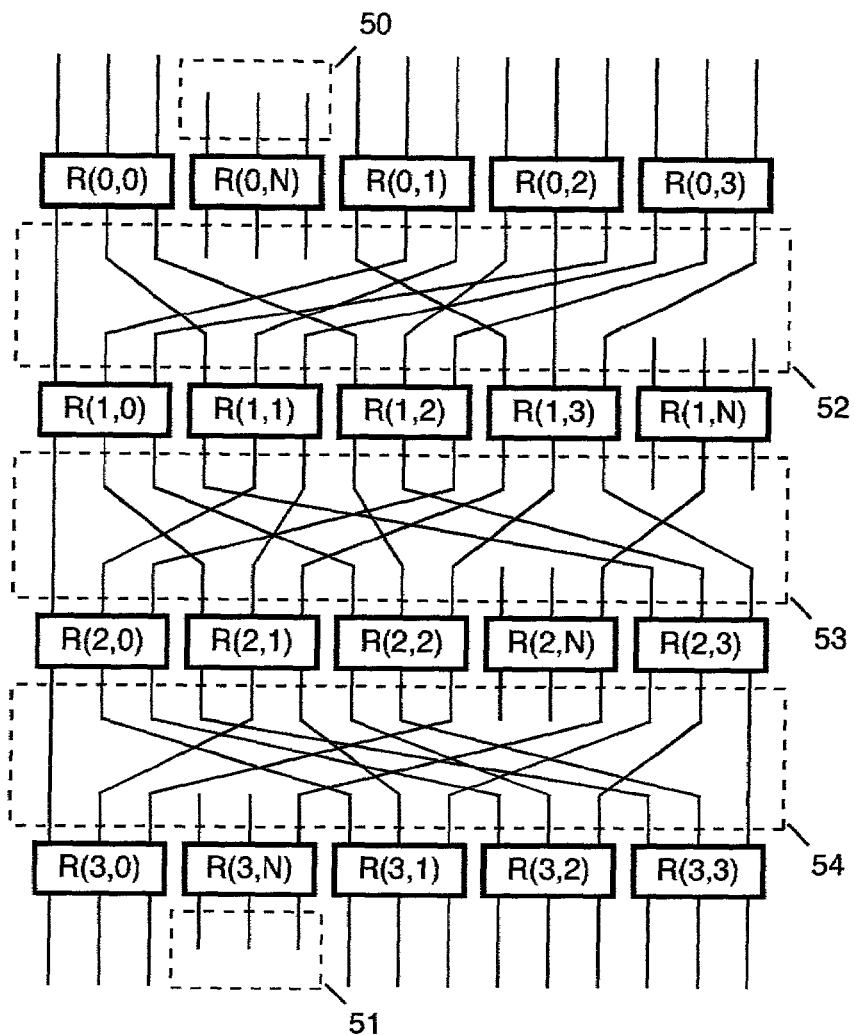
FIG. 3C shows a 24 port RBCCG multistage switching network expanded to a 30 port switching network by inserting a router between R(0,0) and R(0,1) in row 0, after R(1,3) in row 1, between R(2,2) and R(2,3) in row 2, and between R(3,0) and R(3,1) in row 3. Some of the routers are connected together prior to the insertion.

The width of the RBCCG can be expanded by inserting a new router R(0,N) into row 31 of routers in any position; inserting a new router R(1,N) into row 33 of routers in any position; inserting a new router R(2,N) into row 35 of routers in any position; inserting a new router R(3,N) into row 37 of routers in any position. The upgrade can be accomplished by rewiring interconnection networks 32, 34, and 36, without breaking the connections between the top ports of router row 31 and external connections 38 or breaking the connections between the bottom ports of router row 37 and external connections 39. Three examples of insertion positions are shown in FIG. 3A, FIG. 3B, and FIG. 3C.

Figure 14:
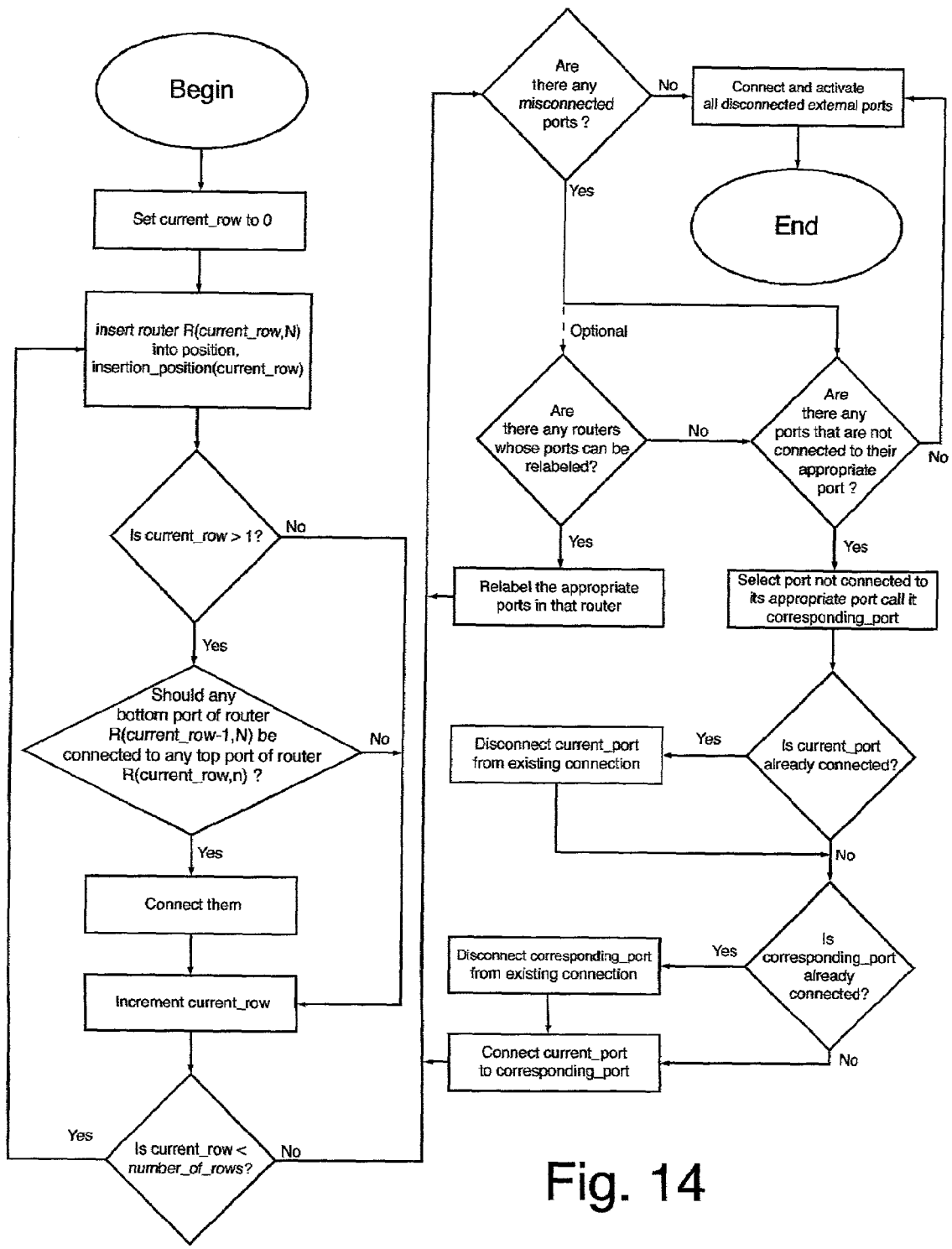
FIG. 14 shows the flowchart for the width expansion algorithm shown in FIG. 9A and FIG. 9C.

The most general form of the upgrade process is given by FIG. 9A, with supporting functions given in FIG. 9C, and flowcharted in FIG. 14. The first major step is to insert the desired new routers into each row. Though the algorithm depicted goes row by row, the order may be arbitrary. Since the ordering does not impact quality factors in the upgrade process, a row by row order is used.

The particular position of the new routers in each row can be arbitrary. The "insertion_position" algorithm consists of: Selecting a position in each row to insert a new router. For each row called current_row, if a connection be made that matches the interconnection pattern of the upgraded network between R(current_row,N) and R(current_row+1,N) connect the appropriate bottom port of R(current_row,N) and the appropriate top port of R(current_row+1,N). If no connection can be made, then the bottom ports of R(current_row,N) and the top ports of R(current_row+1,N) are left alone. A general "insertion_position" algorithm is shown in FIG. 10, along with two specific "insertion_position" algorithms that are used in the examples to come.

The upgrade process continues after the routers are added by selecting any port which is misconnected with respect to the desired final topology. The order of selection does have an impact on the disruption of traffic and even the number of total steps. A more systematic and organized approach is given below in a refinement of this algorithm. Once a port is selected it is rewired by connecting it to its appropriate port with respect to the final topology. Henceforth, this port will be known as its corresponding port. The remainder of the algorithm in FIG. 9A and flowchart FIG. 14 is a detailed description of the rewiring based on the connection states of the port and its corresponding port.

There is also an optional branch in the upgrade process. In scanning the routers, one may discover routers for which some connections originate from the correct routers (with respect to the desired final topology) but connect to the wrong port. If a logical reassignment of port addresses were possible, achieving a virtual port permutation while leaving the physical connections unchanged. This would reduce the number of connections that need to be broken. This step as indicated by the optional branch may be executed at any time, that is it need not be executed in every loop of the algorithm For instance, the sequence could be rewire, relabel, relabel relabel rewire, rewire, relabel, rewire, etc. A more systematic approach is given in a refined version of the upgrade algorithm.

The final step in this process is to connect and activate any new external ports that result from the addition of new ports in this upgrade process.

Figure 15:
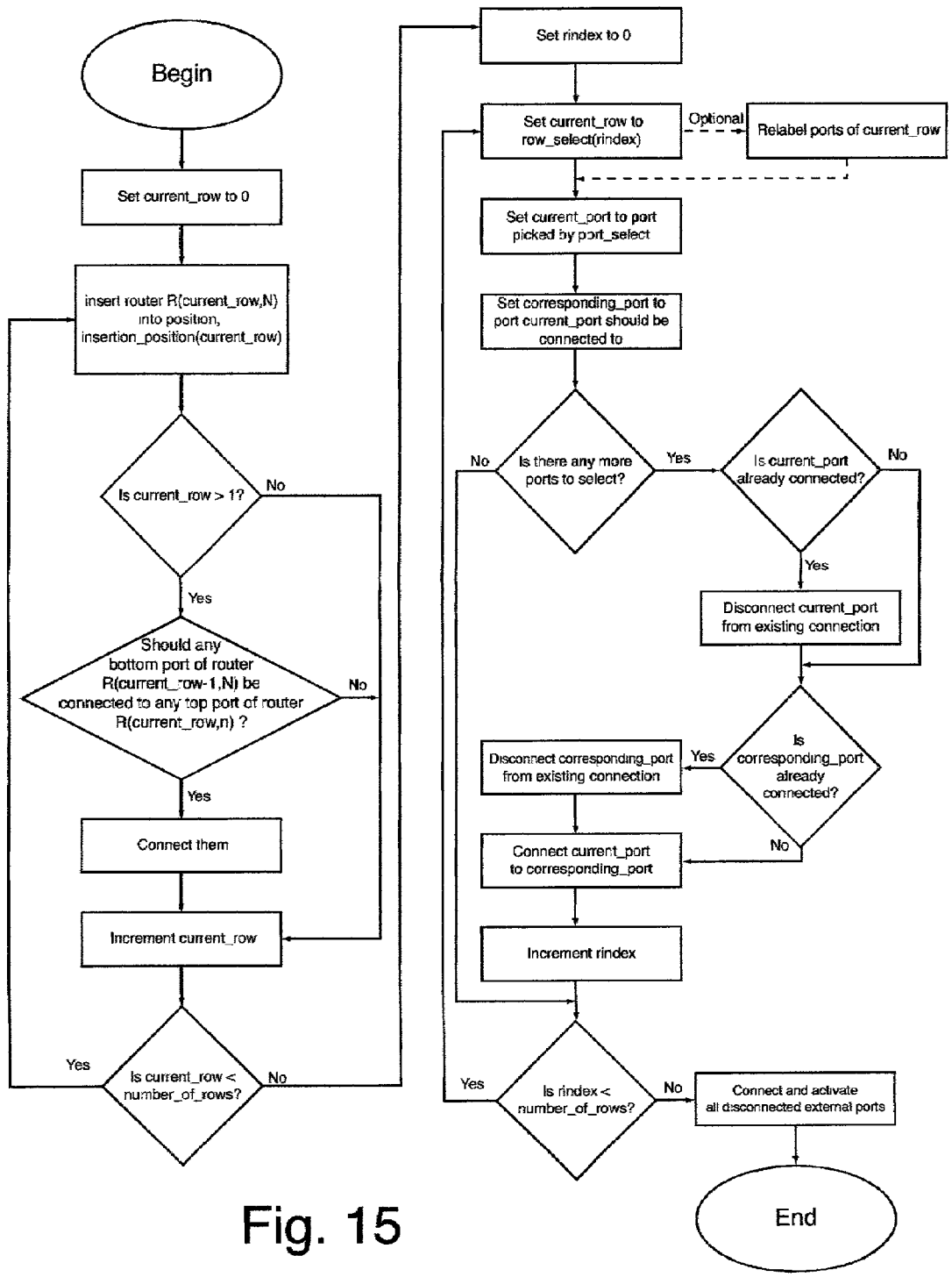
FIG. 15 shows the flowchart for the width expansion algorithm shown in FIG. 9B and FIG. 9C.

The upgrade process is refined in FIG. 9B with flowchart in FIG. 15. The first part with depicting the router insertion and the last step involving the activation of new external ports are the same as the more general algorithm. The distinction is that the rewiring and the optional relabeling is made more systematic. The first refinement is that the process takes place row by row or more precisely interconnection network by interconnection network. This is illustrated by the creation of the "row_select" component. Once a row is selected the optional "relabel_ports" component my be executed for that row. After that, a port that is part of the selected interconnection network, by convention the interconnection network below the selected row, is selected by the "select_port" component and rewired to its corresponding port. These three component algorithms are given in more detail below.

In the examples given below, the process of "diverting traffic" away from a port and "stop diverting traffic" from a port (also called "allow traffic to flow" to a port as stated in FIG. 9C.) should occur automatically whenever a connection is broken (disconnected) and when a connection is established, respectively if the routers are running standard routing protocols such as OSPF. However, the disconnection process may be streamlined by forcing new routing table information to be the routers prior to the connection being broken, thereby speeding the upgrade process and minimizing the impact on traffic. Likewise, a forced change to the routing table may expedite the fall use of bandwidth after a new connection is established. In addition, to streamline the notation in the flowcharts, FIG. 14 and FIG. 15, the act of disconnection also implies the diversion of traffic from its attached ports prior to the breaking of the connection, Also, the act of connecting two ports implies the allowing of new traffic flow through the two ports (or equivalently the "stopping of the diversion of traffic" from the two ports) after the attachment of a connection between the two ports.

Figure 4:
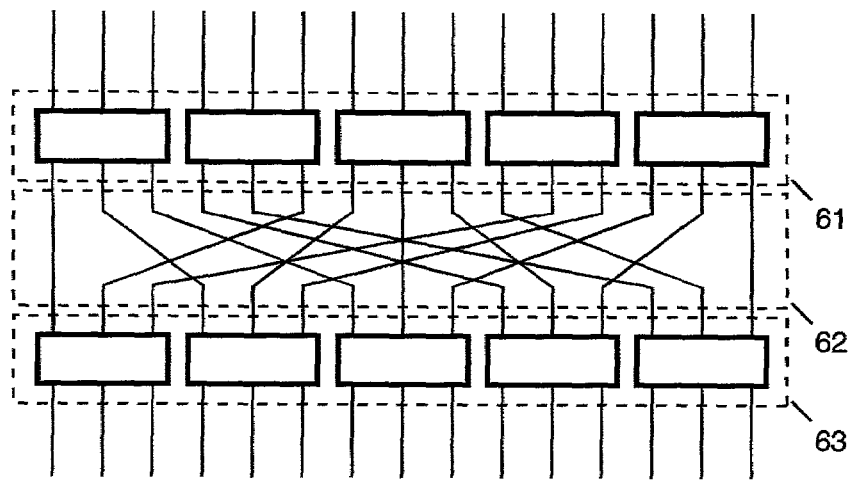
FIG. 4 shows a section of a 30-port RBCCG multistage switching network with the proper interconnection network between two rows of routers.

Various examples of the upgrade process are given in greater detail FIG. 3A shows insertion of the new routers as a column with the new routers added to the end of each row. FIG. 3B and FIG. 3C show the width of each row extended by inserting new routers in various positions within the existing row. FIG. 4 shows the generic interconnection network of a 30-port RBCCG multistage network. This serves as an interconnection template where 61 represents at any given time router row, current_row, and 63, router row, current_row+1, with 62 as the correct interconnection network for a 30-port RBCCG multistage network. In the process of upgrading, interconnection networks 42, 43, and 44 of FIG. 3A will each have to be rewired to look like 62 of FIG. 4. Similarly, interconnection networks 47, 48, and 49 of FIG. 3B and interconnection networks 52, 53 and 54 will each have to be rewired to look like 62 of FIG. 4 for their respective subsequent upgrade steps.

FIG. 3A shows a connection between bottom port 2 of R(0,N) and top port 2 of R(1,N), a connection between bottom port 2 of R(1,N) and top port 2 of R(2,N) and a connection between bottom port 2 of R(2,N) and top port 2 of R(3,N), because their respective connections are the same as those in 62 of FIG. 4.

FIG. 3B shows a connection between bottom port 2 of R(0,N) and top port 2 of R(1,N), a connection between bottom port 1 of R(1,N) and top port 2 of R(2,N) and a connection between bottom port 1 of R(2,N) and top port 2 of R(3,N), ), because their respective connections are the same as those in 62 of FIG. 4.

FIG. 3C shows no connection between R(0,N) and R(1,N), a connection between bottom port 1 of R(1,N) and top port 2 of R(2,N) and a connection between bottom port 2 of R(2,N) and top port 2 of R(3,N), because their respective connections are the same as those in 62 of FIG. 4. The lack of connection between R(0,N) and R(1,N) is due to the lack of a corresponding connection in 62 of FIG. 4.

While all insertion patterns will yield a viable width upgrade, the impact on disruption of throughout bandwidth can vary. Of the three examples illustrated, FIG. 3C is the least desirable since there is not a connection that can be made between R(0,N) and R(1,N) that would not need to be rewired later in the rewiring phase. The insertion illustrated in FIG. 3A and FIG. 3B are more desirable because a connection between R(n,N) and R(n+1,N) can be made prior to the rewiring phase. Of the two, FIG. 3A has the least impact on the throughput bandwidth. However, the subsequent description of this algorithm will focus on FIG. 3B because it illustrates the more general upgrade methodology more diversely.

Once the new routers are inserted. The examples follow the algorithm given in FIG. 9B with examples of the "row_select" and "select_port" components defined and illustrated below.

Figure 16A:
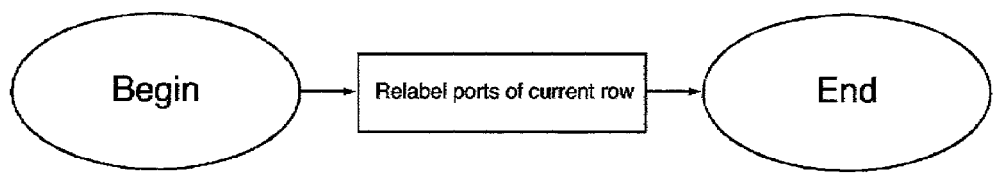
FIG. 16A and FIG. 16B show the flowcharts for the row selection algorithms shown in FIG. 11A and FIG. 11B respectively.
Figure 16B:
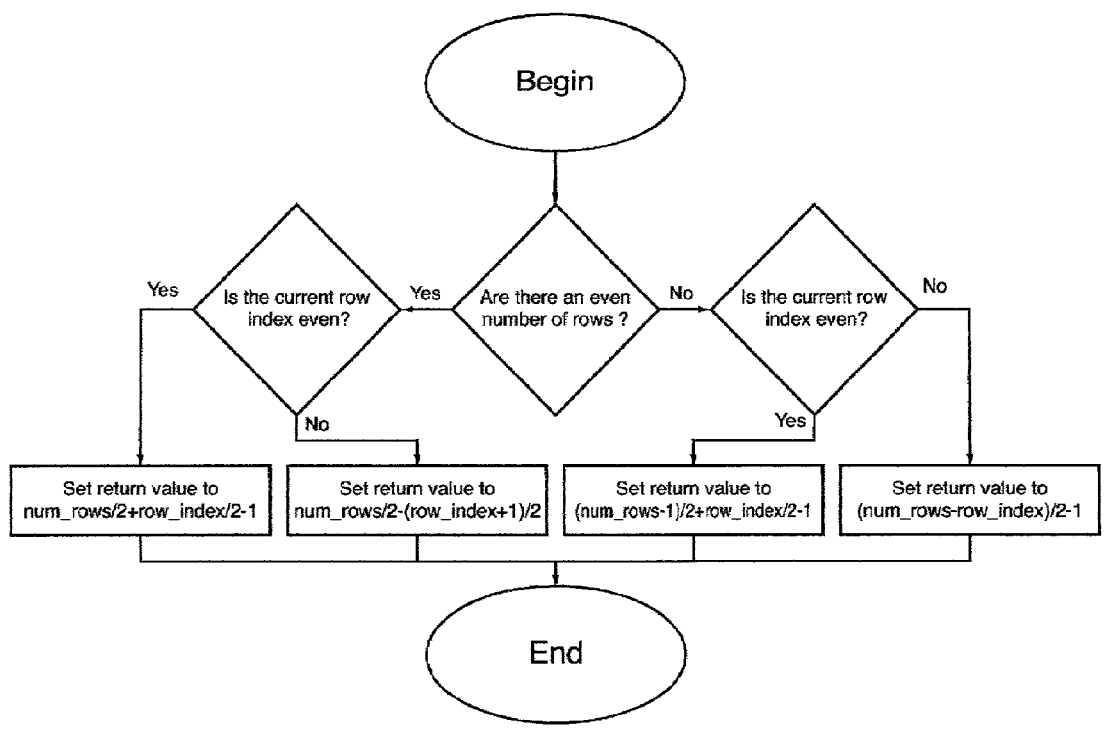

The "row_select" algorithm selects a sequencing of the interconnections between rows. Each interconnection shall be called by the row number, whose bottom ports the interconnections are attached to. This sequence must include all the interconnections, but may be in any order. FIG. 11A shows the best "row_select" algorithm. FIG. 11B shows another common "row_select" algorithm. FIG. 16A and FIG. 16B show the respective flowcharts.

Figure 17A:
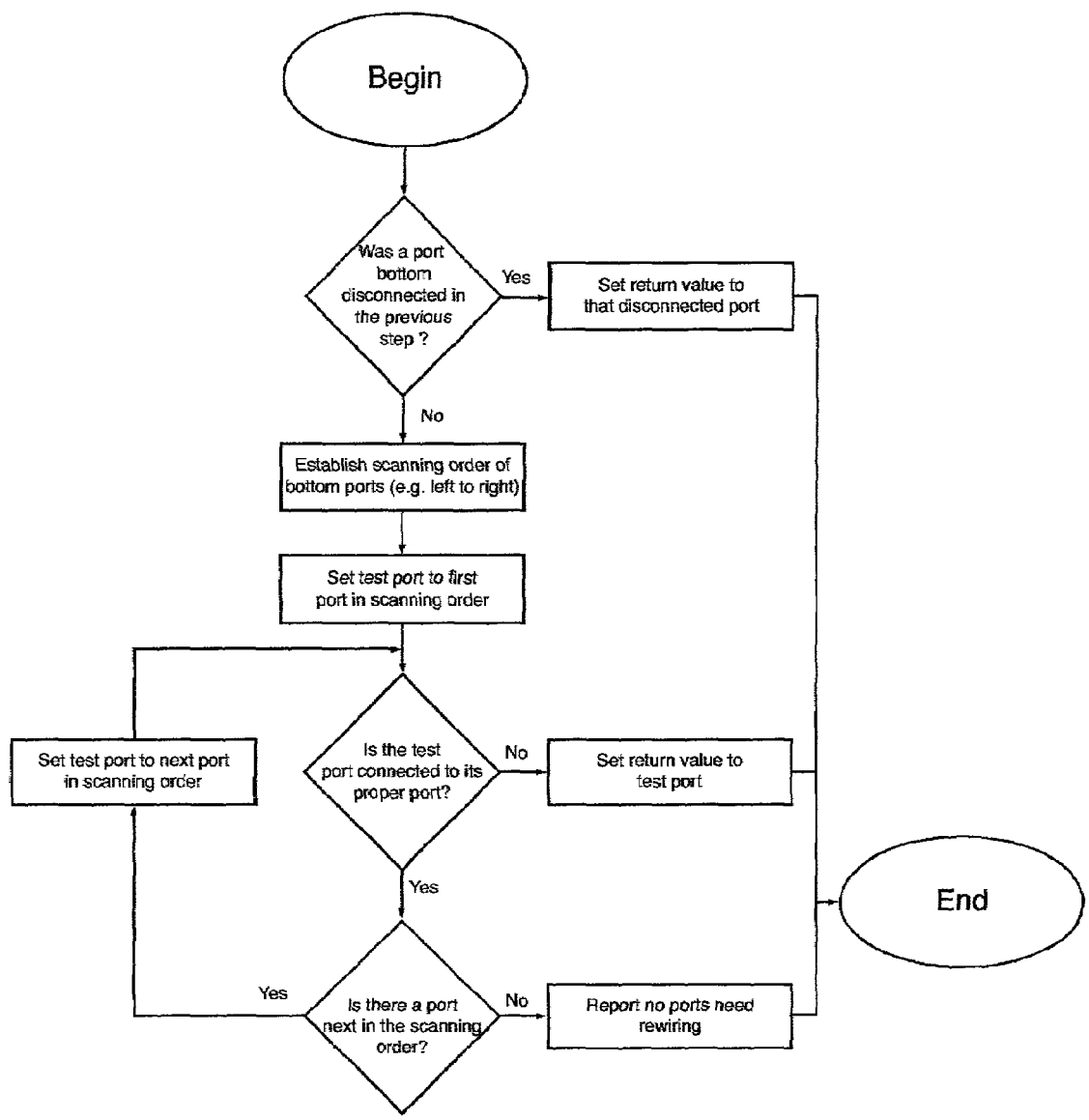
FIG. 17A, FIG. 17B and FIG. 17C show the flowcharts for the port selection algorithms shown in FIG. 12A, FIG. 12B and FIG. 12C, respectively.
Figure 17B:
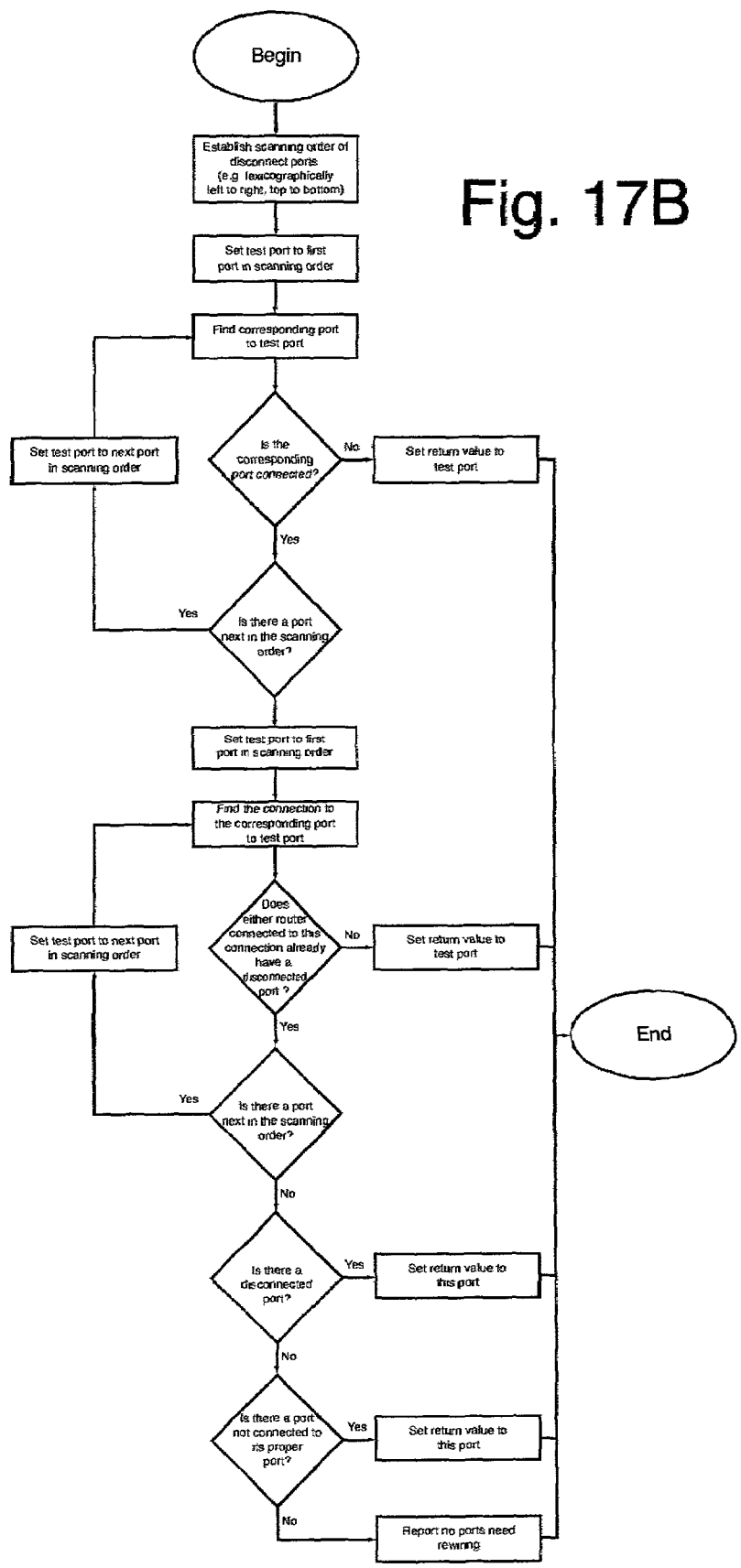
Figure 17C:
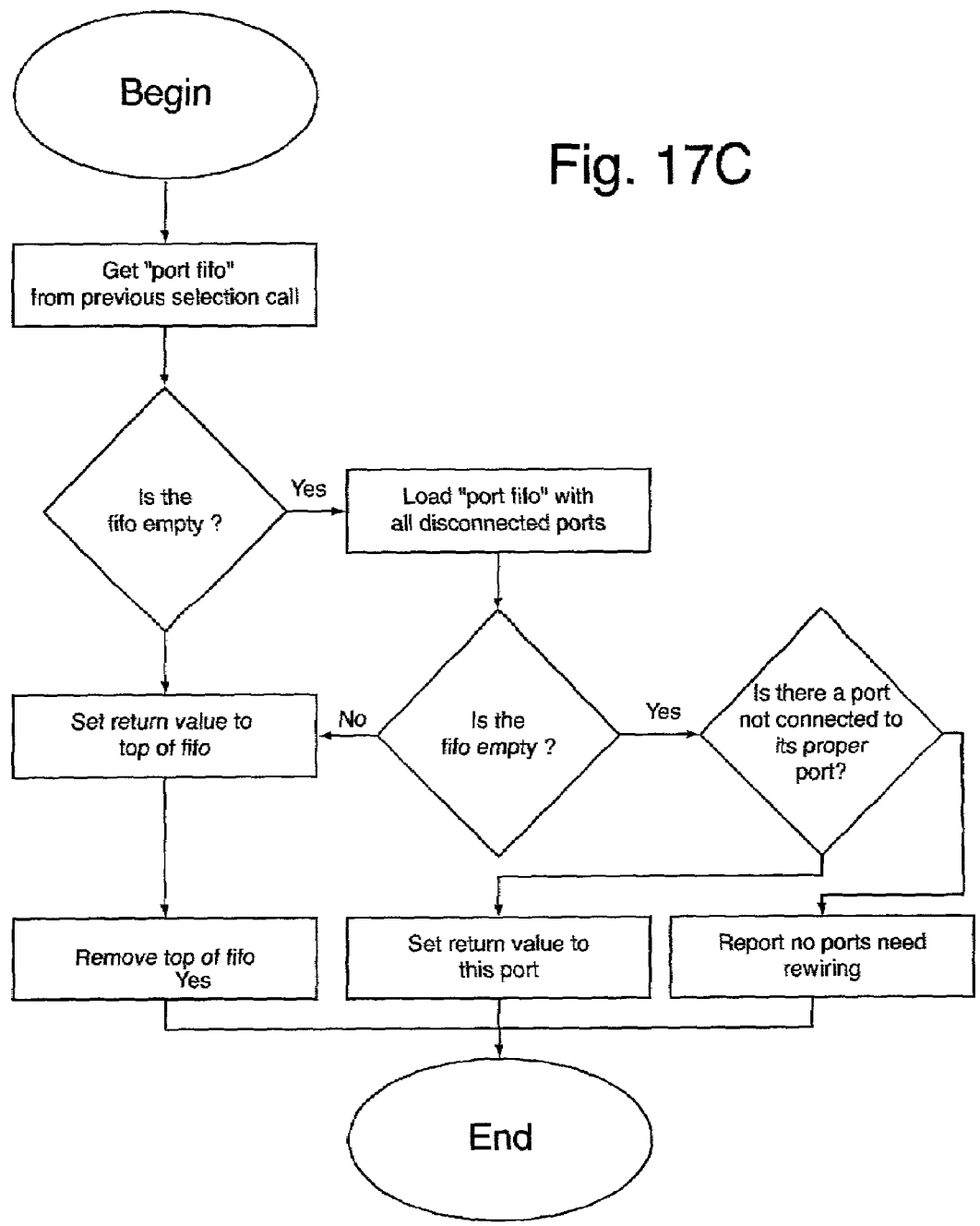

There is an optional relabel_ports stage, which will be described later. The remaining component of the "upgrade" algorithm is the "select_port" port algorithm. During the rewiring of each interconnection network, the basic "upgrade" algorithm calls for the selection of any port, top or bottom not properly connected to it's appropriate corresponding port in accordance with 62 of FIG. 4. Though any port may be selected at each step, it has been found that priority should be given to ports that are not already connected. If a port that is already connected is selected, it may introduce an additional disconnection resulting in degradation of throughput bandwidth. FIG. 12A, FIG. 12B and FIG. 12C show three common "select_port" algorithms. Corresponding flowcharts are shown in FIG. 17A, FIG. 17B, and FIG. 17C.

The upgrade using FIG. 3B as an example is shown in much greater detail. For the sake of diversity of the algorithm, three different port selection algorithms are used for each row. The "row_select" algorithm shown in FIG. 11A is used.

In accordance with this "row_select" algorithm, the first row to be selected as the row in our example is row 1, that is interconnection network, 48, in FIG. 3B.

Figure 5A:
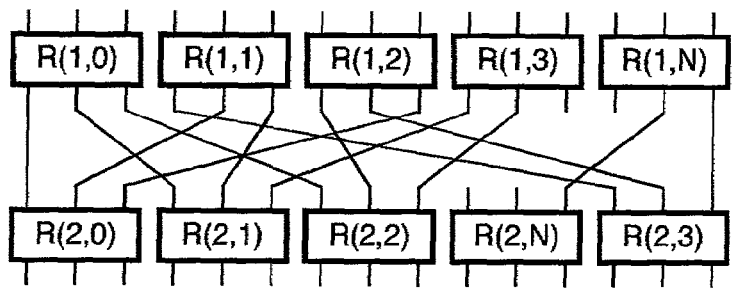
FIG. 5A, FIG. 5B, FIG. 5C, FIG. 5D, FIG. 5E, FIG. 5F, FIG. 5G, FIG. 5H, FIG. 5I, and FIG. 5J show the connections between router rows R(1,*) and R(2,*) being rewired into a 30 port RBCCG multistage switching network interconnection by moving the connection from bottom port 2 of R(1,3) to bottom port 2 of R(1,N); moving the connection from bottom port 0 of R(1,3) to bottom port 2 of R(1,3); moving the connection from bottom port 1 of R(1,2) to bottom port 0 of R(1,3); moving the connection from bottom port 0 of R(1,2) to bottom port 1 of R(1,2); moving the connection from bottom port 2 of R(1,1) to bottom port 0 of R(1,2); moving the connection from bottom port 1 of R(1,1) to bottom port 2 of R(1,1); moving the connection from bottom port 0 of R(1,1) to bottom port 1 of R(1,1); adding a connection between bottom port 0 of R(1,1) and top port 0 of R(2,N); moving the connection from bottom port 1 of R(1,3) to bottom port 0 of R(1,N); moving the connection from bottom port 2 of R(1,2) to bottom port 1 of R(1,3), respectively.

In the rewiring of interconnection network, 48, the "select_port" algorithm shown in FIG. 12A is employed. The process begins by selecting bottom port 2 of R(1,N) because scanning from right to left it is the first bottom port not connected to it's corresponding port, top port 2 of R(2,3), according to FIG. 4. Top port 2 of R(2,3) is currently connected to bottom port 2 of R(1,3). Divert traffic from top port 2 of R(2,3) and bottom port 2 of R(1,3). Stop top port 2 of R(2,3) and bottom port 2 of R(1,3). Disconnect top port 2 of R(2,3) and bottom port 2 of R(1,3) and move the disconnected connection to bottom port 2 of R(1,N) as shown in FIG. 5A. Start bottom port 2 of R(1,N) and top port 2 of R(2,3). Stop diverting the traffic from bottom port 2 of R(1,N) and top port 2 of R(2,3).

Figure 5B:
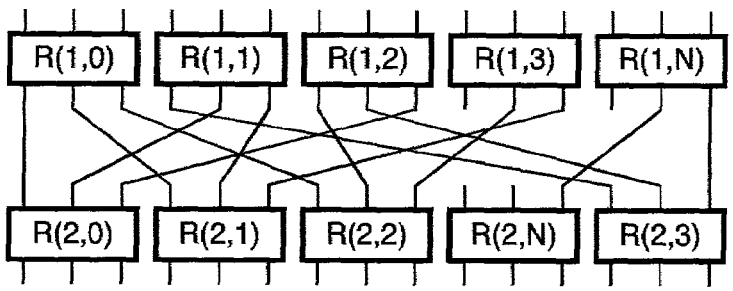

The process continues by selecting bottom port 2 of R(1,3) because it was disconnected in the previous step shown in FIG. 5A. Bottom port 2 of R(1,3) should be connected to top port 2 of R(2,1) according to FIG. 4. Top port 2 of R(2,1) is currently connected to bottom port 0 of R(1,3). Divert traffic from top port 2 of R(2,1) and bottom port 0 of R(1,3). Stop top port 2 of R(2,1) and bottom port 0 of R(1,3). Disconnect top port 2 of R(2,1) and bottom port 0 of R(1,3) and move the disconnected connection to bottom port 2 of R(1,3) as shown in FIG. 5B. Start bottom port 2 of R(1,3) and top port 2 of R(2,1). Stop diverting the traffic from bottom port 2 of R(1,3) and top port 2 of R(2,1).

Figure 5C:
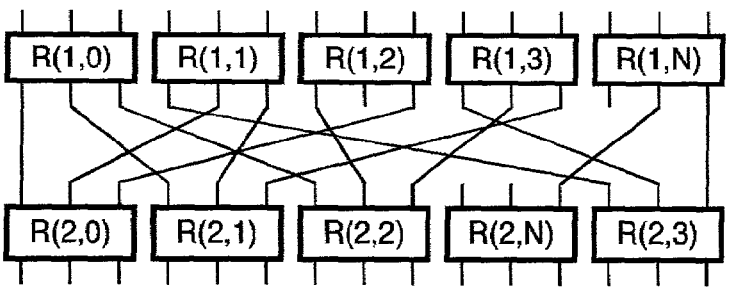

The process continues by selecting bottom port 0 of R(1,3) because it was disconnected in the previous step shown in FIG. 5B. Bottom port 0 of R(1,3) should be connected to top port 1 of R(2,3) according to FIG. 4. Top port 1 of R(2,3) is currently connected to bottom port 1 of R(1,2). Divert traffic from top port 1 of R(2,3) and bottom port 1 of R(1,2). Stop top port 1 of R(2,3) and bottom port 1 of R(1,2). Disconnect top port 1 of R(2,3) and bottom port 1 of R(1,2) and move the disconnected connection to bottom port 0 of R(1,3) as shown in FIG. 5C. Start bottom port 0 of R(1,3) and top port 1 of R(2,3). Stop diverting the traffic from bottom port 0 of R(1,3) and top port 1 of R(2,3).

Figure 5D:
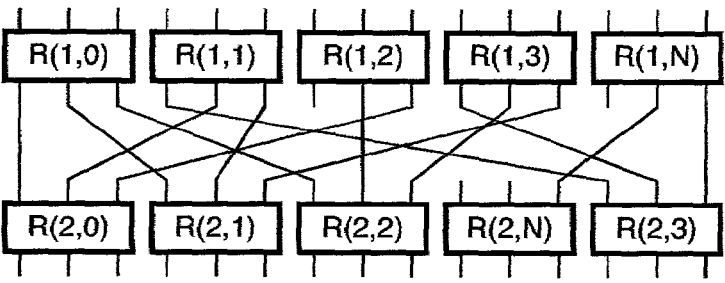

The process continues by selecting bottom port 1 of R(1,2) because it was disconnected in the previous step shown in FIG. 5C. Bottom port 1 of R(1,2) should be connected to top port 1 of R(2,2) according to FIG. 4. Top port 1 of R(2,2) is currently connected to bottom port 0 of R(1,2). Divert traffic from top port 1 of R(2,2) and bottom port 0 of R(1,2). Stop top port 1 of R(2,2) and bottom port 0 of R(1,2). Disconnect top port 1 of R(2,2) and bottom port 0 of R(1,2) and move the disconnected connection to bottom port 1 of R(1,2) as shown in FIG. 5D. Start bottom port 1 of R(1,2) and top port 1 of R(2,2). Stop diverting the traffic from bottom port 1 of R(1,2) and top port 1 of R(2,2).

Figure 5E:
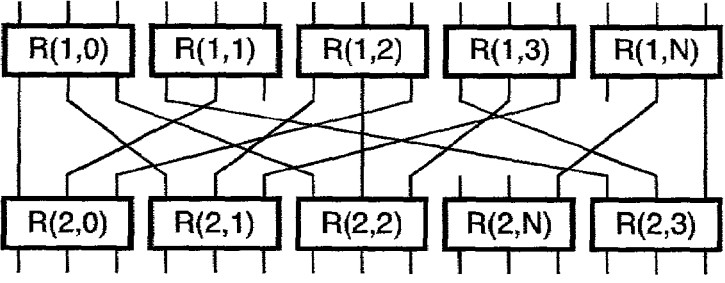

The process continues by selecting bottom port 0 of R(1,2) because it was disconnected in the previous step shown in FIG. 5D. Bottom port 0 of R(1,2) should be connected to top port 1 of R(2,1) according to FIG. 4. Top port 1 of R(2,1) is currently connected to bottom port 2 of R(1,1). Divert traffic from top port 1 of R(2,1) and bottom port 2 of R(1,1). Stop top port 1 of R(2,1) and bottom port 2 of R(1,1). Disconnect top port 1 of R(2,1) and bottom port 2 of R(1,1) and move the disconnected connection to bottom port 0 of R(1,2) as shown in FIG. 5E. Start bottom port 0 of R(1,2) and top port 1 of R(2,1). Stop diverting the traffic from bottom port 0 of R(1,2) and top port 1 of R(2,1).

Figure 5F:
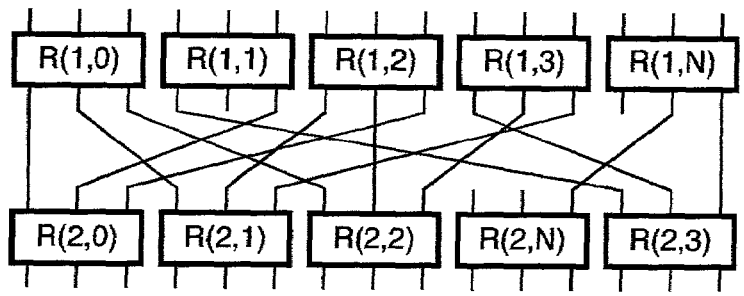

The process continues by selecting bottom port 2 of R(1,1) because it was disconnected in the previous step shown in FIG. 5E. Bottom port 2 of R(1,1) should be connected to top port 1 of R(2,0) according to FIG. 4. Top port 1 of R(2,0) is currently connected to bottom port 1 of R(1,1). Divert traffic from top port 1 of R(2,0) and bottom port 1 of R(1,1). Stop top port 1 of R(2,0) and bottom port 1 of R(1,1). Disconnect top port 1 of R(2,0) and bottom port 1 of R(1,1) and move the disconnected connection to bottom port 2 of R(1,1) as shown in FIG. 5F. Start bottom port 2 of R(1,1) and top port 1 of R(2,0). Stop diverting the traffic from bottom port 2 of R(1,1) and top port 1 of R(2,0).

Figure 5G:
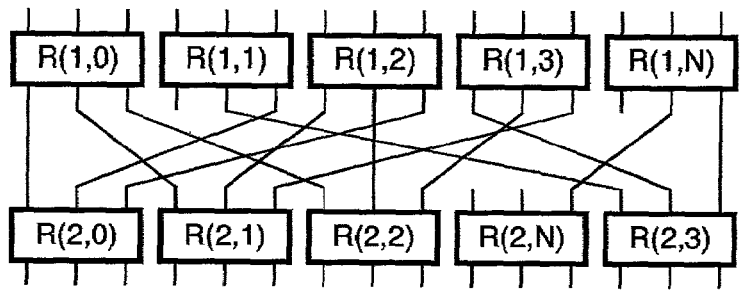

The process continues by selecting bottom port 1 of R(1,1) because it was disconnected in the previous step shown in FIG. 5F. Bottom port 1 of R(1,1) should be connected to top port 0 of R(2,3) according to FIG. 4. Top port 0 of R(2,3) is currently connected to bottom port 0 of R(1,1). Divert traffic from top port 0 of R(2,3) and bottom port 0 of R(1,1). Stop top port 0 of R(2,3) and bottom port 0 of R(1,1). Disconnect top port 0 of R(2,3) and bottom port 0 of R(1,1) and move the disconnected connection to bottom port 1 of R(1,1) as shown in FIG. 5G. Start bottom port 1 of R(1,1) and top port 0 of R(2,3). Stop diverting the traffic from bottom port 1 of R(1,1) and top port 0 of R(2,3).

Figure 5H:
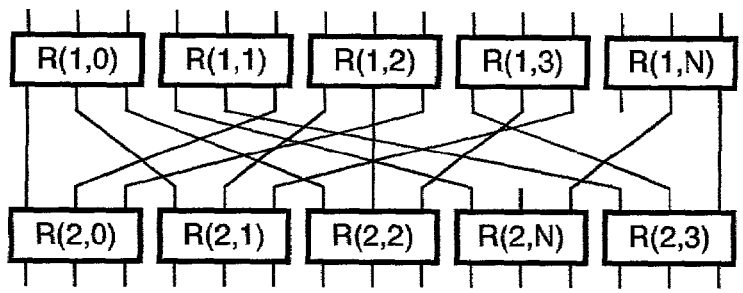

The process continues by selecting bottom port 0 of R(1,1) because it was disconnected in the previous step shown in FIG. 5G. Bottom port 0 of R(1,1) should be connected to top port 0 of R(2,N) according to FIG. 4. Top port 0 of R(2,N) is currently not connected. Establish a new connection between bottom port 0 of R(1,1) and top port 0 of R(2,N) as shown in FIG. 5H. Start bottom port 0 of R(1,1) and top port 0 of R(2,N). Stop diverting the traffic from bottom port 0 of R(1,1) and top port 0 of R(2,N).

Figure 5I:
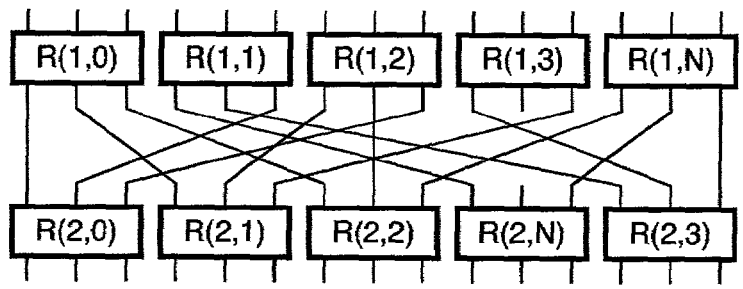

The process continues by selecting bottom port 0 of R(1,N) because scanning from right to left it is the first bottom port not connected to it's corresponding port, top port 2 of R(2,2), according to FIG. 4. Top port 2 of R(2,2) is currently connected to bottom port 1 of R(1,3). Divert traffic from top port 2 of R(2,2) and bottom port 1 of R(1,3). Stop top port 2 of R(2,2) and bottom port 1 of R(1,3). Disconnect top port 2 of R(2,2) and bottom port 1 of R(1,3) and move the disconnected connection to bottom port 0 of R(1,N) as shown in FIG. 5I. Start bottom port 0 of R(1,N) and top port 2 of R(2,2). Stop diverting the traffic from bottom port 0 of R(1,N) and top port 2 of R(2,2).

Figure 5J:
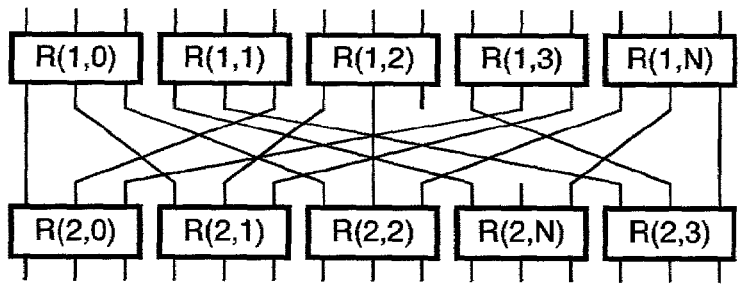

The process continues by selecting bottom port 1 of R(1,3) because it was disconnected in the previous step shown in FIG. 5I. Bottom port 1 of R(1,3) should be connected to top port 2 of R(2,0) according to FIG. 4. Top port 2 of R(2,0) is currently connected to bottom port 2 of R(1,2). Divert traffic from top port 2 of R(2,0) and bottom port 2 of R(1,2). Stop top port 2 of R(2,0) and bottom port 2 of R(1,2). Disconnect top port 2 of R(2,0) and bottom port 2 of R(1,2) and move the disconnected connection to bottom port 1 of R(1,3) as shown in FIG. 5J. Start bottom port 1 of R(1,3) and top port 2 of R(2,0). Stop diverting the traffic from bottom port 1 of R(1,3) and top port 2 of R(2,0).

Figure 5K:
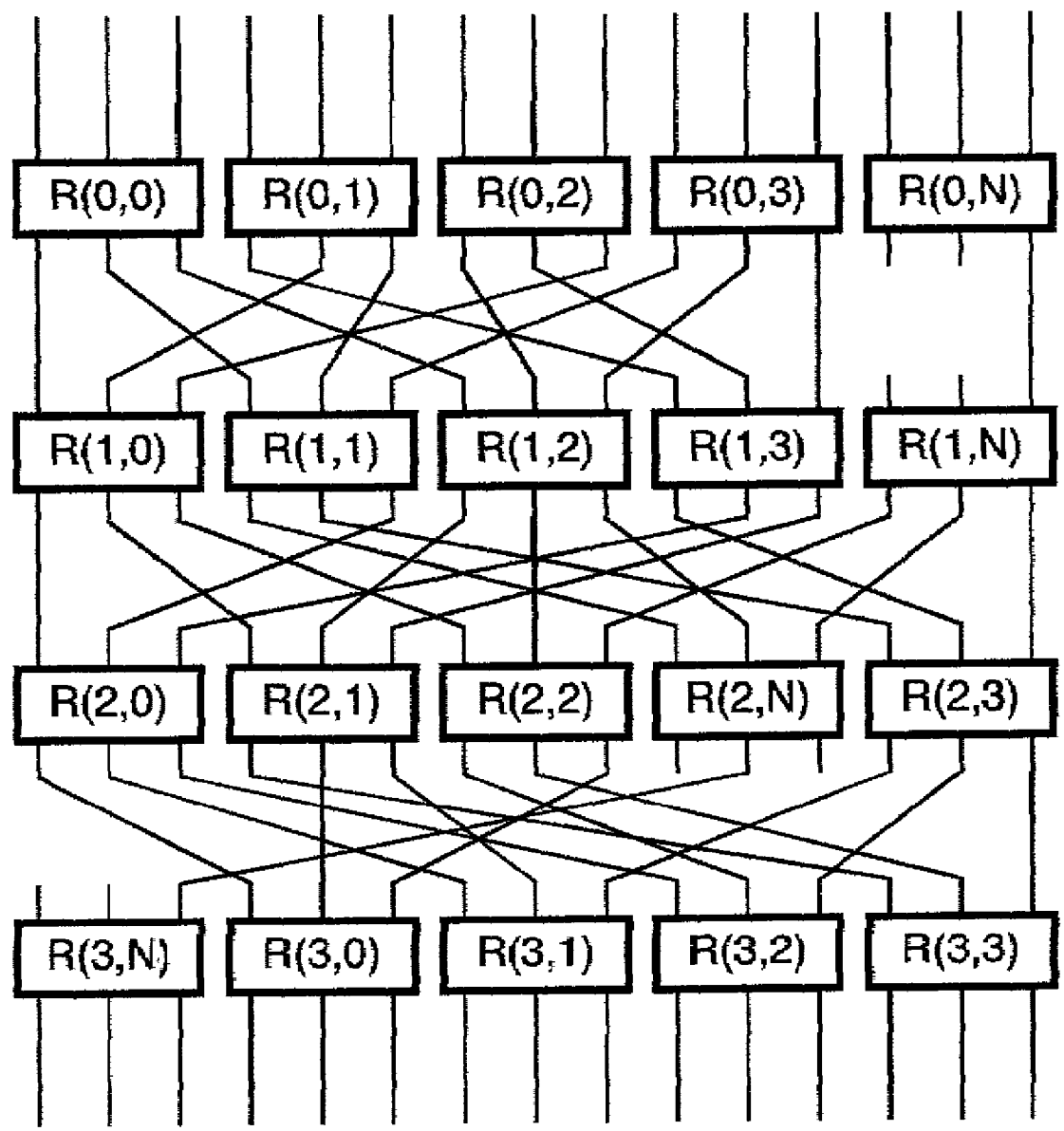
FIG. 5K shows a partially upgraded 30 port multistage switching network with a completed rewire of the interconnections between router rows R(1,*) and R(2,*) after adding a connection between bottom port 2 of R(1,2) and top port 1 of R(2,N).

The process continues by selecting bottom port 2 of R(1,2) because it was disconnected in the previous step shown in FIG. 5J. Bottom port 2 of R(1,2) should be connected to top port 1 of R(2,N) according to FIG. 4. Top port 1 of R(2,N) is currently not connected. Establish a new connection between bottom port 2 of R(1,2) and top port 1 of R(2,N) as shown in FIG. 5K. Start bottom port 2 of R(1,2) and top port 1 of R(2,N). Stop diverting the traffic from bottom port 2 of R(1,2) and top port 1 of R(2,N). This completes the rewiring of the interconnection network, 48, between row 1 and row 2.

In accordance with the "row_select" algorithm of FIG. 11A, the second row to be selected as the row in our example is row 0, that is interconnection network, 47 in FIG. 3B.

In the rewiring of interconnection network, 47, the "select_port" algorithm shown in FIG. 12B is employed. This algorithm is substantially more complex than that in used previously in FIG. 12A, so at each step, the selection process is described in much detail first before the rewiring is described in detail.

Scanning from right to left, no port, top or bottom, has a corresponding port which is not connected. Again, scanning from right to left, bottom port 1 of R(0,N) is not connected to anything with corresponding port according to FIG. 4, top port 2 of R(1,3). Top port 2 of R(1,3) is currently connected to bottom port 2 of R(0,3). The breaking of this connection does not leave router R(0,3) or router R(1,3) with more than one broken connection. This completes the selection process for this step.

Figure 6A:
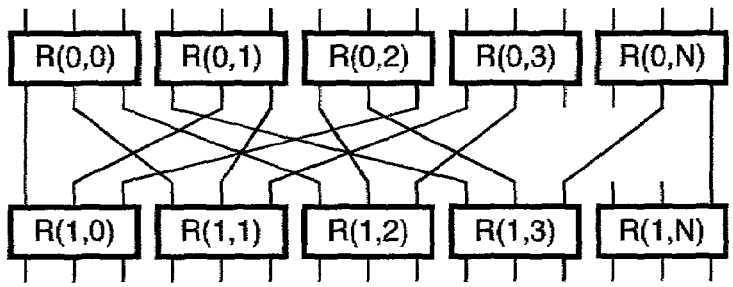
FIG. 6A, FIG. 6B, FIG. 6C, FIG. 6D, FIG. 6E, FIG. 6F, FIG. 6G, FIG. 6H, and FIG. 6I show the connections between router rows R(0,*) and R(1,*) being rewired into a 30 port RBCCG multistage switching network interconnection by moving the connection from bottom port 2 of R(0,3) to bottom port 1 of R(0,N); moving the connection from top port 1 of R(1,0) to top port 0 of R(1,N); moving the connection from top port 1 of R(1,1) to top port 1 of R(1,0); moving the connection from top port 1 of R(1,2) to top port 1 of R(1,1); moving the connection from top port 1 of R(1,3) to top port 1 of R(1,2); moving the connection from top port 2 of R(1,0) to top port 1 of R(1,3); moving the connection from top port 2 of R(1,1) to top port 1 of R(1,N); adding a connection between bottom port 2 of R(0,3) and top port 2 of R(1,1); moving the connection from bottom port 1 of R(0,3) to bottom port 0 of R(0,N), respectively.

With bottom port 1 of R(0,N) selected and recalling that its corresponding port, top port 2 of R(1,3), is connected to bottom port 2 of R(0,3), the process continues by diverting traffic from top port 2 of R(1,3) and bottom port 2 of R(0,3); stopping top port 2 of R(1,3) and bottom port 2 of R(0,3); disconnecting top port 2 of R(1,3) and bottom port 2 of R(0,3) and moving the disconnected connection to bottom port 1 of R(0,N) as shown in FIG. 6A; starting bottom port 1 of R(0,N) and top port 2 of R(1,3); and stop diverting the traffic from bottom port 1 of R(0,N) and top port 2 of R(1,3).

Scanning from right to left, no port, top or bottom, has a corresponding port which is not connected. Again, scanning from right to left, top port 1 of R(1,N) is not connected to anything with corresponding port according to FIG. 4, bottom port 0 of R(0,3). Bottom port 0 of R(0,3) is currently connected to top port 2 of R(1,1). The breaking this connection introduces a second broken connection to R(0,3), so top port 1 of R(1,N) is not selected. Continuing to scan from right to left, bottom port 0 of R(0,N) is not connected to anything with corresponding port according to FIG. 4, top port 2 of R(1,2). Top port 2 of R(1,2) is currently connected to bottom port 1 of R(0,3). The breaking this connection introduces a second broken connection to R(0,3), so bottom port 0 of R(0,N) is not selected. Continuing to scan from right to left, top port 0 of R(1,N) is not connected to anything with corresponding port according to FIG. 4, bottom port 1 of R(0,1). Bottom port 1 of R(0,1) is currently connected to top port 1 of R(1,0). The breaking of this connection does not leave router R(0,1) or router R(1,0) with more than one broken connection. This completes the selection process for this step.

Figure 6B:
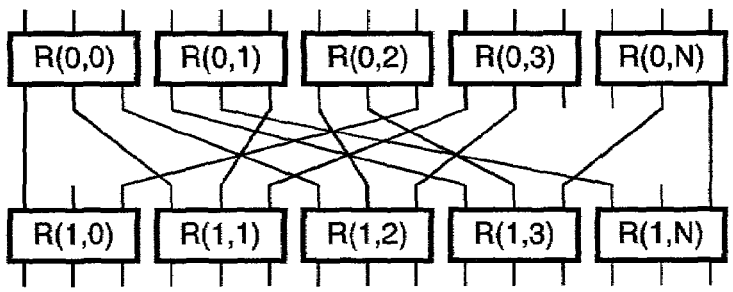

With top port 0 of R(1,N) selected and recalling that its corresponding port, bottom port 1 of R(0,1), is connected to top port 1 of R(1,0), the process continues by diverting traffic from bottom port 1 of R(0,1) and top port 1 of R(1,0); stopping bottom port 1 of R(0,1) and top port 1 of R(1,0); disconnecting bottom port 1 of R(0,1) and top port 1 of R(1,0) and moving the disconnected connection to top port 0 of R(1,N) as shown in FIG. 6B; starting top port 0 of R(1,N) and bottom port 1 of R(0,1); and stop diverting the traffic from top port 0 of R(1,N) and bottom port 1 of R(0,1).

Scanning from right to left, no port, top or bottom, has a corresponding port which is not connected. Again, scanning from right to left, top port 1 of R(1,N) is not connected to anything with corresponding port according to FIG. 4, bottom port 0 of R(0,3). Bottom port 0 of R(0,3) is currently connected to top port 2 of R(1,1). The breaking this connection introduces a second broken connection to R(0,3), so top port 1 of R(1,N) is not selected. Continuing to scan from right to left, bottom port 0 of R(0,N) is not connected to anything with corresponding port according to FIG. 4, top port 2 of R(1,2). Top port 2 of R(1,2) is currently connected to bottom port 1 of R(0,3). The breaking this connection introduces a second broken connection to R(0,3), so bottom port 0 of R(0,N) is not selected. Continuing to scan from right to left, bottom port 2 of R(0,3) is not connected to anything with corresponding port according to FIG. 4, top port 2 of R(1,1). Top port 2 of R(1,1) is currently connected to bottom port 0 of R(0,3). The breaking this connection introduces a second broken connection to R(0,3), so bottom port 2 of R(0,3) is not selected. Continuing to scan from right to left, top port 1 of R(1,0) is not connected to anything with corresponding port according to FIG. 4, bottom port 2 of R(0,1). Bottom port 2 of R(0,1) is currently connected to top port 1 of R(1,1). The breaking of this connection does not leave router R(0,1) or router R(1,1) with more than one broken connection. This completes the selection process for this step.

Figure 6C:
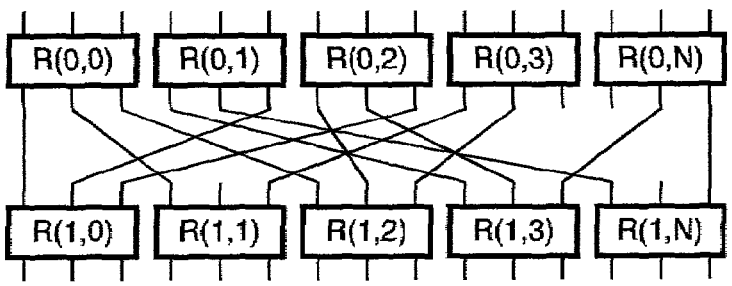

With top port 1 of R(1,0) selected and recalling that its corresponding port, bottom port 2 of R(0,1), is connected to top port 1 of R(1,1), the process continues by diverting traffic from bottom port 2 of R(0,1) and top port 1 of R(1,1); stopping bottom port 2 of R(0,1) and top port 1 of R(1,1); disconnecting bottom port 2 of R(0,1) and top port 1 of R(1,1) and moving the disconnected connection to top port 1 of R(1,0) as shown in FIG. 6C; starting top port 1 of R(1,0) and bottom port 2 of R(0,1); and stop diverting the traffic from top port 1 of R(1,0) and bottom port 2 of R(0,1).

Scanning from right to left, no port, top or bottom, has a corresponding port which is not connected. Again, scanning from right to left, top port 1 of R(1,N) is not connected to anything with corresponding port according to FIG. 4, bottom port 0 of R(0,3). Bottom port 0 of R(0,3) is currently connected to top port 2 of R(1,1). The breaking this connection introduces a second broken connection to R(0,3), so top port 1 of R(1,N) is not selected. Continuing to scan from right to left, bottom port 0 of R(0,N) is not connected to anything with corresponding port according to FIG. 4, top port 2 of R(1,2). Top port 2 of R(1,2) is currently connected to bottom port 1 of R(0,3). The breaking this connection introduces a second broken connection to R(0,3), so bottom port 0 of R(0,N) is not selected. Continuing to scan from right to left, bottom port 2 of R(0,3) is not connected to anything with corresponding port according to FIG. 4, top port 2 of R(1,1). Top port 2 of R(1,1) is currently connected to bottom port 0 of R(0,3). The breaking this connection introduces a second broken connection to R(0,3), so bottom port 2 of R(0,3) is not selected. Continuing to scan from right to left, top port 1 of R(1,1) is not connected to anything with corresponding port according to FIG. 4, bottom port 0 of R(0,2). Bottom port 0 of R(0,2) is currently connected to top port 1 of R(1,2). The breaking of this connection does not leave router R(0,2) or router R(1,2) with more than one broken connection. This completes the selection process for this step.

Figure 6D:
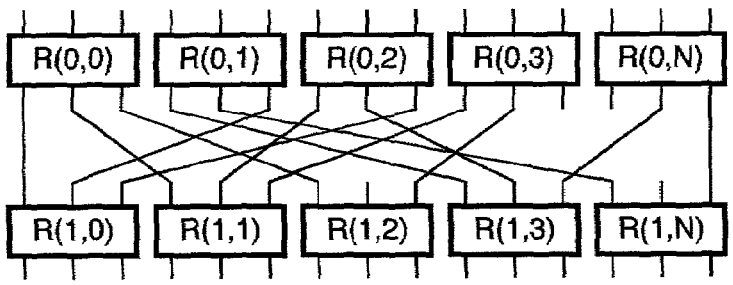

With top port 1 of R(1,1) selected and recalling that its corresponding port, bottom port 0 of R(0,2), is connected to top port 1 of R(1,2), the process continues by diverting traffic from bottom port 0 of R(0,2) and top port 1 of R(1,2); stopping bottom port 0 of R(0,2) and top port 1 of R(1,2); disconnecting bottom port 0 of R(0,2) and top port 1 of R(1,2) and moving the disconnected connection to top port 1 of R(1,1) as shown in FIG. 6D; starting top port 1 of R(1,1) and bottom port 0 of R(0,2); and stop diverting the traffic from top port 1 of R(1,1) and bottom port 0 of R(0,2).

Scanning from right to left, no port, top or bottom, has a corresponding port which is not connected. Again, scanning from right to left, top port 1 of R(1,N) is not connected to anything with corresponding port according to FIG. 4, bottom port 0 of R(0,3). Bottom port 0 of R(0,3) is currently connected to top port 2 of R(1,1). The breaking this connection introduces a second broken connection to R(0,3), so top port 1 of R(1,N) is not selected. Continuing to scan from right to left, bottom port 0 of R(0,N) is not connected to anything with corresponding port according to FIG. 4, top port 2 of R(1,2). Top port 2 of R(1,2) is currently connected to bottom port 1 of R(0,3). The breaking this connection introduces a second broken connection to R(0,3), so bottom port 0 of R(0,N) is not selected. Continuing to scan from right to left, bottom port 2 of R(0,3) is not connected to anything with corresponding port according to FIG. 4, top port 2 of R(1,1). Top port 2 of R(1,1) is currently connected to bottom port 0 of R(0,3). The breaking this connection introduces a second broken connection to R(0,3), so bottom port 2 of R(0,3) is not selected. Continuing to scan from right to left, top port 1 of R(1,2) is not connected to anything with corresponding port according to FIG. 4, bottom port 1 of R(0,2). Bottom port 1 of R(0,2) is currently connected to top port 1 of R(1,3). The breaking of this connection does not leave router R(0,2) or router R(1,3) with more than one broken connection. This completes the selection process for this step.

Figure 6E:
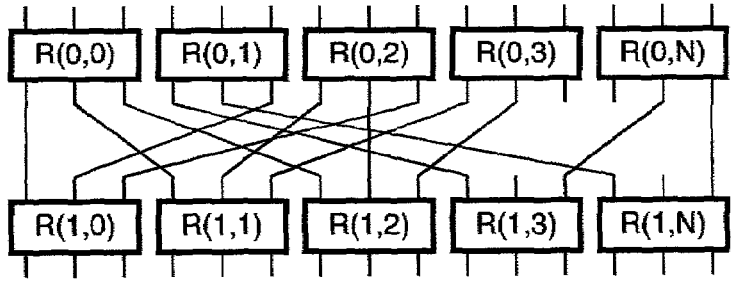

With top port 1 of R(1,2) selected and recalling that its corresponding port, bottom port 1 of R(0,2), is connected to top port 1 of R(1,3), the process continues by diverting traffic from bottom port 1 of R(0,2) and top port 1 of R(1,3); stopping bottom port 1 of R(0,2) and top port 1 of R(1,3); disconnecting bottom port 1 of R(0,2) and top port 1 of R(1,3) and moving the disconnected connection to top port 1 of R(1,2) as shown in FIG. 6E; starting top port 1 of R(1,2) and bottom port 1 of R(0,2); and stop diverting the traffic from top port 1 of R(1,2) and bottom port 1 of R(0,2).

Scanning from right to left, no port, top or bottom, has a corresponding port which is not connected. Again, scanning from right to left, top port 1 of R(1,N) is not connected to anything with corresponding port according to FIG. 4, bottom port 0 of R(0,3). Bottom port 0 of R(0,3) is currently connected to top port 2 of R(1,1). The breaking this connection introduces a second broken connection to R(0,3), so top port 1 of R(1,N) is not selected. Continuing to scan from right to left, bottom port 0 of R(0,N) is not connected to anything with corresponding port according to FIG. 4, top port 2 of R(1,2). Top port 2 of R(1,2) is currently connected to bottom port 1 of R(0,3). The breaking this connection introduces a second broken connection to R(0,3), so bottom port 0 of R(0,N) is not selected. Continuing to scan from right to left, bottom port 2 of R(0,3) is not connected to anything with corresponding port according to FIG. 4, top port 2 of R(1,1). Top port 2 of R(1,1) is currently connected to bottom port 0 of R(0,3). The breaking this connection introduces a second broken connection to R(0,3), so bottom port 2 of R(0,3) is not selected. Continuing to scan from right to left, top port 1 of R(1,3) is not connected to anything with corresponding port according to FIG. 4, bottom port 2 of R(0,2). Bottom port 2 of R(0,2) is currently connected to top port 2 of R(1,0). The breaking of this connection does not leave router R(0,2) or router R(1,0) with more than one broken connection. This completes the selection process for this step.

Figure 6F:
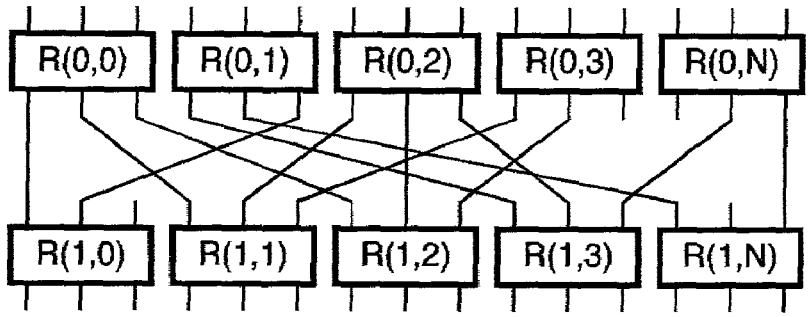

With top port 1 of R(1,3) selected and recalling that its corresponding port, bottom port 2 of R(0,2), is connected to top port 2 of R(1,0), the process continues by diverting traffic from bottom port 2 of R(0,2) and top port 2 of R(1,0); stopping bottom port 2 of R(0,2) and top port 2 of R(1,0); disconnecting bottom port 2 of R(0,2) and top port 2 of R(1,0) and moving the disconnected connection to top port 1 of R(1,3) as shown in FIG. 6F; starting top port 1 of R(1,3) and bottom port 2 of R(0,2); and stop diverting the traffic from top port 1 of R(1,3) and bottom port 2 of R(0,2).

Scanning from right to left, no port, top or bottom, has a corresponding port which is not connected. Again, scanning from right to left, top port 1 of R(1,N) is not connected to anything with corresponding port according to FIG. 4, bottom port 0 of R(0,3). Bottom port 0 of R(0,3) is currently connected to top port 2 of R(1,1). The breaking this connection introduces a second broken connection to R(0,3), so top port 1 of R(1,N) is not selected. Continuing to scan from right to left, bottom port 0 of R(0,N) is not connected to anything with corresponding port according to FIG. 4, top port 2 of R(1,2). Top port 2 of R(1,2) is currently connected to bottom port 1 of R(0,3). The breaking this connection introduces a second broken connection to R(0,3), so bottom port 0 of R(0,N) is not selected. Continuing to scan from right to left, bottom port 2 of R(0,3) is not connected to anything with corresponding port according to FIG. 4, top port 2 of R(1,1). Top port 2 of R(1,1) is currently connected to bottom port 0 of R(0,3). The breaking this connection introduces a second broken connection to R(0,3), so bottom port 2 of R(0,3) is not selected. Continuing to scan from right to left, top port 2 of R(1,0) is not connected to anything with corresponding port according to FIG. 4, bottom port 1 of R(0,3). Bottom port 1 of R(0,3) is currently connected to top port 2 of R(1,2). The breaking this connection introduces a second broken connection to R(0,3), so top port 2 of R(1,0) is not selected. Since none of the ports that are not connected satisfy the second port selection criterion, the selection process continues by selecting the rightmost port not connected to anything, that is top port 1 of R(1,N).

Figure 6G:
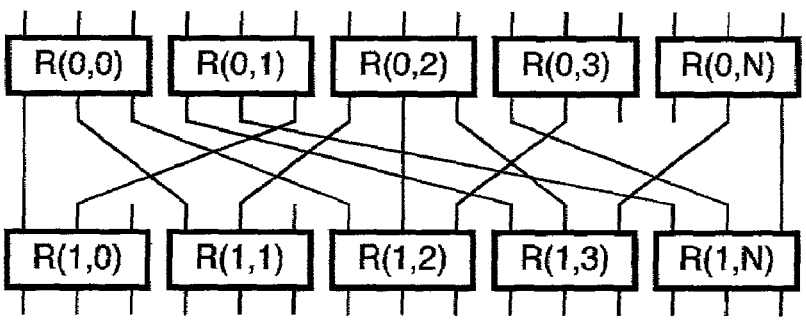

With top port 1 of R(1,N) selected and recalling that its corresponding port, bottom port 0 of R(0,3), is connected to top port 2 of R(1,1), the process continues by diverting traffic from bottom port 0 of R(0,3) and top port 2 of R(1,1); stopping bottom port 0 of R(0,3) and top port 2 of R(1,1); disconnecting bottom port 0 of R(0,3) and top port 2 of R(1,1) and moving the disconnected connection to top port 1 of R(1,N) as shown in FIG. 6G; starting top port 1 of R(1,N) and bottom port 0 of R(0,3); and stop diverting the traffic from top port 1 of R(1,N) and bottom port 0 of R(0,3).

Figure 6H:
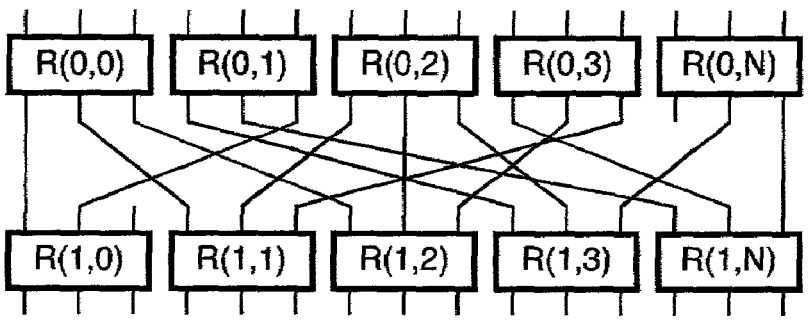

The process continues by selecting bottom port 2 of R(0,3) because scanning from right to left, it is the first port bottom or top not connected to anything and whose corresponding port (according to FIG. 4) is also not connected to anything; establishing a new connection between bottom port 2 of R(0,3) and top port 2 of R(1,1) as shown in FIG. 6H; starting bottom port 2 of R(0,3) and top port 2 of R(1,1); and stop diverting the traffic from bottom port 2 of R(0,3) and top port 2 of R(1,1).

Scanning from right to left, no port, top or bottom, has a corresponding port which is not connected. Again, scanning from right to left, bottom port 0 of R(0,N) is not connected to anything with corresponding port according to FIG. 4, top port 2 of R(1,2). Top port 2 of R(1,2) is currently connected to bottom port 1 of R(0,3). The breaking of this connection does not leave router R(0,3) or router R(1,2) with more than one broken connection. This completes the selection process for this step.

Figure 6I:
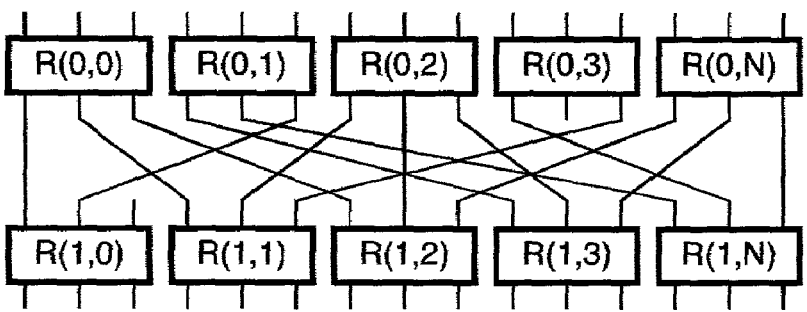

With bottom port 0 of R(0,N) selected and recalling that its corresponding port, top port 2 of R(1,2), is connected to bottom port 1 of R(0,3), the process continues by diverting traffic from top port 2 of R(1,2) and bottom port 1 of R(0,3); stopping top port 2 of R(1,2) and bottom port 1 of R(0,3); disconnecting top port 2 of R(1,2) and bottom port 1 of R(0,3) and moving the disconnected connection to bottom port 0 of R(0,N) as shown in FIG. 6I; starting bottom port 0 of R(0,N) and top port 2 of R(1,2); and stop diverting the traffic from bottom port 0 of R(0,N) and top port 2 of R(1,2).

Figure 6J:
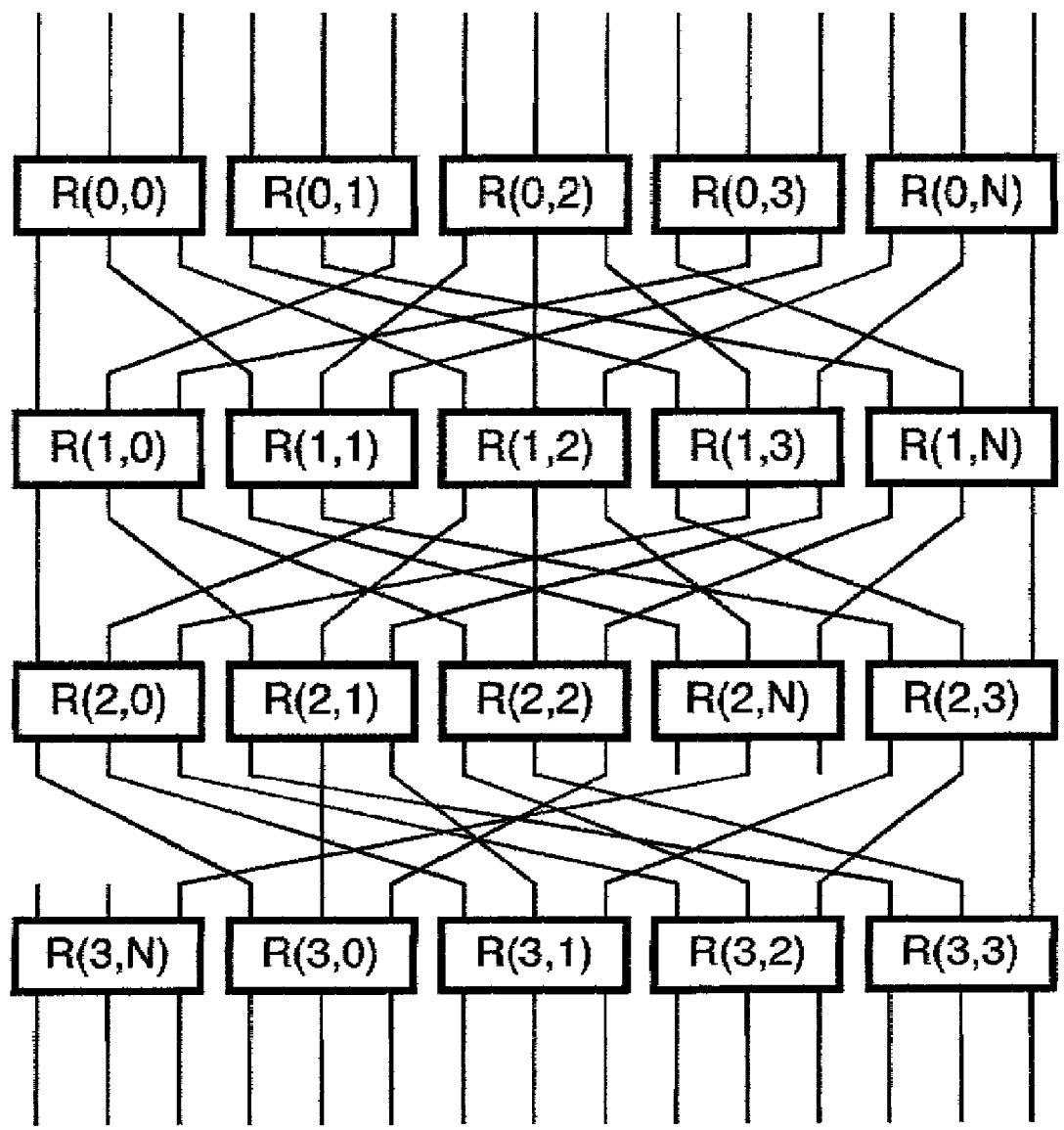
FIG. 6J shows a partially upgraded 30 port multistage switching network with a completed rewire of the interconnections between router rows R(0,*) and R(1,*) after adding a connection between bottom port 1 of R(0,3) and top port 2 of R(1,0).

The process continues by selecting bottom port 1 of R(0,3) because scanning from right to left, it is the first port bottom or top not connected to anything and whose corresponding port (according to FIG. 4) is also not connected to anything; establishing a new connection between bottom port 1 of R(0,3) and top port 2 of R(1,0) as shown in FIG. 6J; starting bottom port 1 of R(0,3) and top port 2 of R(1,0); and stop diverting the traffic from bottom port 1 of R(0,3) and top port 2 of R(1,0). This completes the rewiring of interconnection network, 47, between row 0 and row 1.

In accordance with the "row_select" algorithm of FIG. 11A, the third row to be selected as the row in our example is row 2, that is interconnection network, 49, in FIG. 3B.

In the rewiring of interconnection network, 49, the "select_port" algorithm shown in FIG. 12C is employed. This algorithm is intended to show a more arbitrary method of selecting ports that still yields good results. In addition when loading up the "port fifo" we alternate scanning left to right for top ports then bottom ports that aren't.

The process begins by loading the port fifo with {top port 0 of R(3,N), bottom port 0 of R(2,N), top port 1 of R(3,N), bottom port 2 of R(2,N)}.

Figure 7A:
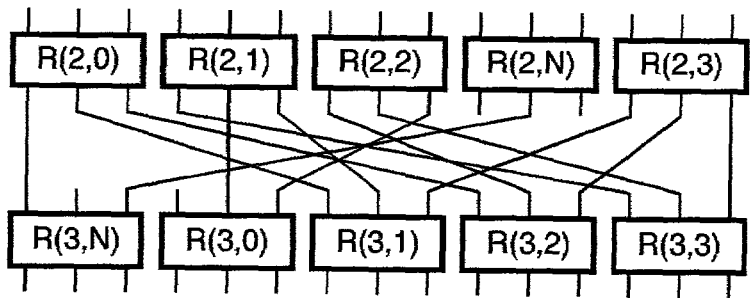
FIG. 7A, FIG. 7B, FIG. 7C, FIG. 7D, FIG. 7E, FIG. 7F, FIG. 7G, FIG. 7H, FIG. 7I, and FIG. 7J show the connections between router rows R(2,*) and R(3,*) being rewired into a 30 port RBCCG multistage switching network interconnection by moving the connection from top port 0 of R(3,0) to top port 0 of R(3,N); moving the connection from bottom port 1 of R(2,2) to bottom port 0 of R(2,N); moving the connection from top port 1 of R(3,1) to top port 1 of R(3,N); adding a connection between top port 1 of R(3,1) and bottom port 1 of R(2,2); moving the connection from bottom port 2 of R(2,2) to bottom port 2 of R(2,N); moving the connection from top port 0 of R(3,1) to top port 0 of R(3,0); moving the connection from bottom port 0 of R(2,2) to bottom port 2 of R(2,2); moving the connection from top port 0 of R(3,2) to top port 0 of R(3,1); moving the connection from bottom port 1 of R(2,1) to bottom port 0 of R(2,2); moving the connection from top port 0 of R(3,3) to top port 0 of R(3,2), respectively.

The process continues by selecting top port 0 of R(3,N) because no port top or bottom has a corresponding port that is not connected and, it is the first port in the port fifo. Top port 0 of R(3,N) should be connected to bottom port 0 of R(2,0) according to FIG. 4. Bottom port 0 of R(2,0) is currently connected to top port 0 of R(3,0). Divert traffic from bottom port 0 of R(2,0) and top port 0 of R(3,0). Stop bottom port 0 of R(2,0) and top port 0 of R(3,0). Disconnect bottom port 0 of R(2,0) and top port 0 of R(3,0) and move the disconnected connection to top port 0 of R(3,N) as shown in FIG. 7A. Start top port 0 of R(3,N) and bottom port 0 of R(2,0). Stop diverting the traffic from top port 0 of R(3,N) and bottom port 0 of R(2,0).

Figure 7B:
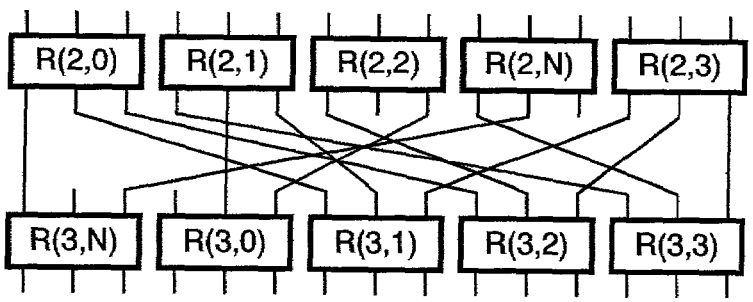

The port fifo now contains {bottom port 0 of R(2,N), top port 1 of R(3,N), bottom port 2 of R(2,N)}. The process continues by selecting bottom port 0 of R(2,N) because no port top or bottom has a corresponding port that is not connected and, it is the first port in the port fifo. Bottom port 0 of R(2,N) should be connected to top port 1 of R(3,3) according to FIG. 4. Top port 1 of R(3,3) is currently connected to bottom port 1 of R(2,2). Divert traffic from top port 1 of R(3,3) and bottom port 1 of R(2,2). Stop top port 1 of R(3,3) and bottom port 1 of R(2,2). Disconnect top port 1 of R(3,3) and bottom port 1 of R(2,2) and move the disconnected connection to bottom port 0 of R(2,N) as shown in FIG. 7B. Start bottom port 0 of R(2,N) and top port 1 of R(3,3). Stop diverting the traffic from bottom port 0 of R(2,N) and top port 1 of R(3,3).

Figure 7C:
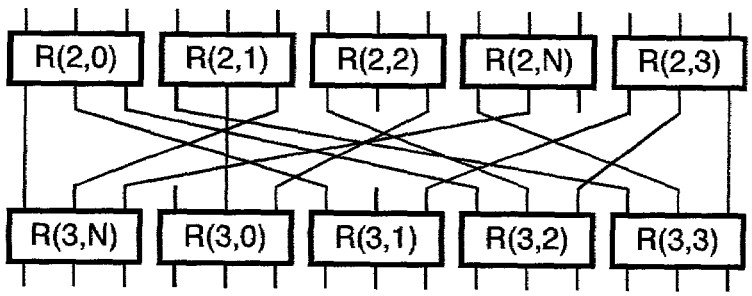

The port fifo now contains {top port 1 of R(3,N), bottom port 2 of R(2,N)}. The process continues by selecting top port 1 of R(3,N) because no port top or bottom has a corresponding port that is not connected and, it is the first port in the port fifo. Top port 1 of R(3,N) should be connected to bottom port 2 of R(2,1) according to FIG. 4. Bottom port 2 of R(2,1) is currently connected to top port 1 of R(3,1). Divert traffic from bottom port 2 of R(2,1) and top port 1 of R(3,1). Stop bottom port 2 of R(2,1) and top port 1 of R(3,1). Disconnect bottom port 2 of R(2,1) and top port 1 of R(3,1) and move the disconnected connection to top port 1 of R(3,N) as shown in FIG. 7C. Start top port 1 of R(3,N) and bottom port 2 of R(2,1). Stop diverting the traffic from top port 1 of R(3,N) and bottom port 2 of R(2,1).

Figure 7D:
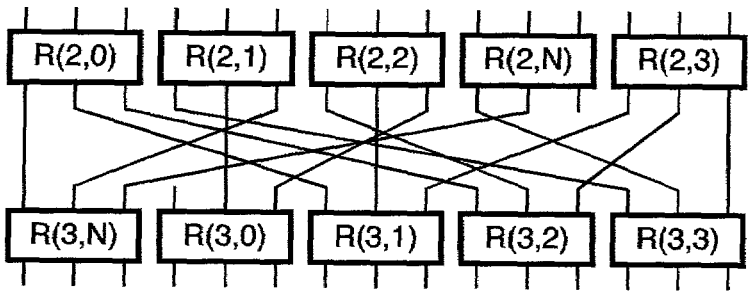

The process continues by selecting top port 1 of R(3,1) because scanning from right to left, it is the first port bottom or top not connected to anything and whose corresponding port (according to FIG. 4) is also not connected to anything. Establish a new connection between top port 1 of R(3,1) and bottom port 1 of R(2,2) as shown in FIG. 7D. Start top port 1 of R(3,1) and bottom port 1 of R(2,2). Stop diverting the traffic from top port 1 of R(3,1) and bottom port 1 of R(2,2).

Figure 7E:
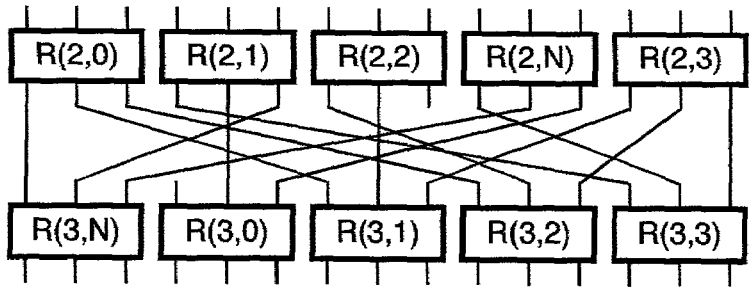

The port fifo now contains {bottom port 2 of R(2,N)}. The process continues by selecting bottom port 2 of R(2,N) because no port top or bottom has a corresponding port that is not connected and, it is the first port in the port fifo. Bottom port 2 of R(2,N) should be connected to top port 2 of R(3,0) according to FIG. 4. Top port 2 of R(3,0) is currently connected to bottom port 2 of R(2,2). Divert traffic from top port 2 of R(3,0) and bottom port 2 of R(2,2). Stop top port 2 of R(3,0) and bottom port 2 of R(2,2). Disconnect top port 2 of R(3,0) and bottom port 2 of R(2,2) and move the disconnected connection to bottom port 2 of R(2,N) as shown in FIG. 7E. Start bottom port 2 of R(2,N) and top port 2 of R(3,0). Stop diverting the traffic from bottom port 2 of R(2,N) and top port 2 of R(3,0).

The port fifo is now empty. The process continues by loading the port fifo with {top port 0 of R(3,0), bottom port 2 of R(2,2)}.

Figure 7F:
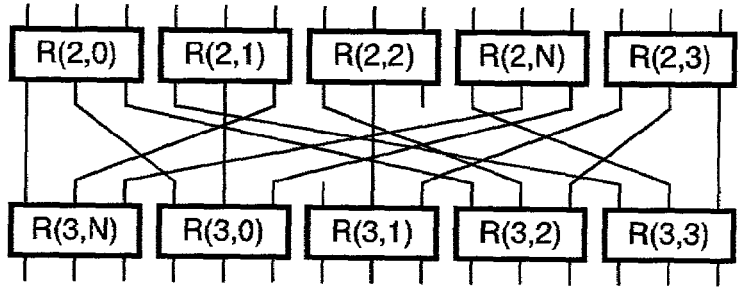

The process continues by selecting top port 0 of R(3,0) because no port top or bottom has a corresponding port that is not connected and, it is the first port in the port fifo. Top port 0 of R(3,0) should be connected to bottom port 1 of R(2,0) according to FIG. 4. Bottom port 1 of R(2,0) is currently connected to top port 0 of R(3,1). Divert traffic from bottom port 1 of R(2,0) and top port 0 of R(3,1). Stop bottom port 1 of R(2,0) and top port 0 of R(3,1). Disconnect bottom port 1 of R(2,0) and top port 0 of R(3,1) and move the disconnected connection to top port 0 of R(3,0) as shown in FIG. 7F. Start top port 0 of R(3,0) and bottom port 1 of R(2,0). Stop diverting the traffic from top port 0 of R(3,0) and bottom port 1 of R(2,0).

Figure 7G:
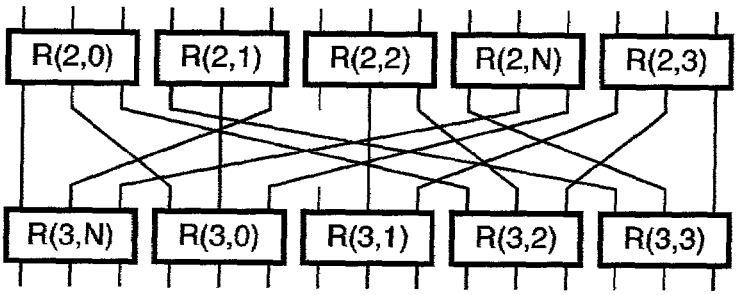

The port fifo now contains {bottom port 2 of R(2,2)}. The process continues by selecting bottom port 2 of R(2,2) because no port top or bottom has a corresponding port that is not connected and, it is the first port in the port fifo. Bottom port 2 of R(2,2) should be connected to top port 1 of R(3,2) according to FIG. 4. Top port 1 of R(3,2) is currently connected to bottom port 0 of R(2,2). Divert traffic from top port 1 of R(3,2) and bottom port 0 of R(2,2). Stop top port 1 of R(3,2) and bottom port 0 of R(2,2). Disconnect top port 1 of R(3,2) and bottom port 0 of R(2,2) and move the disconnected connection to bottom port 2 of R(2,2) as shown in FIG. 7G. Start bottom port 2 of R(2,2) and top port 1 of R(3,2). Stop diverting the traffic from bottom port 2 of R(2,2) and top port 1 of R(3,2).

The port fifo is now empty. The process continues by loading the port fifo with {top port 0 of R(3,1), bottom port 0 of R(2,2)}.

Figure 7H:
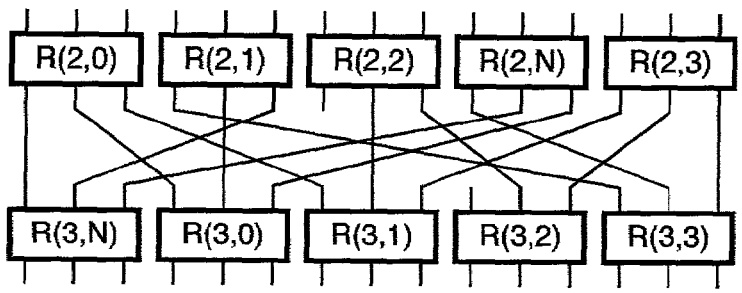

The process continues by selecting top port 0 of R(3,1) because no port top or bottom has a corresponding port that is not connected and, it is the first port in the port fifo. Top port 0 of R(3,1) should be connected to bottom port 2 of R(2,0) according to FIG. 4. Bottom port 2 of R(2,0) is currently connected to top port 0 of R(3,2). Divert traffic from bottom port 2 of R(2,0) and top port 0 of R(3,2). Stop bottom port 2 of R(2,0) and top port 0 of R(3,2). Disconnect bottom port 2 of R(2,0) and top port 0 of R(3,2) and move the disconnected connection to top port 0 of R(3,1) as shown in FIG. 7H. Start top port 0 of R(3,1) and bottom port 2 of R(2,0). Stop diverting the traffic from top port 0 of R(3,1) and bottom port 2 of R(2,0).

Figure 7I:
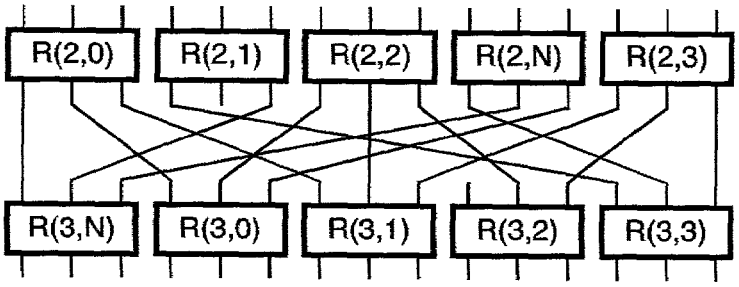

The port fifo now contains {bottom port 0 of R(2,2)}. The process continues by selecting bottom port 0 of R(2,2) because no port top or bottom has a corresponding port that is not connected and, it is the first port in the port fifo. Bottom port 0 of R(2,2) should be connected to top port 1 of R(3,0) according to FIG. 4. Top port 1 of R(3,0) is currently connected to bottom port 1 of R(2,1). Divert traffic from top port 1 of R(3,0) and bottom port 1 of R(2,1). Stop top port 1 of R(3,0) and bottom port 1 of R(2,1). Disconnect top port 1 of R(3,0) and bottom port 1 of R(2,1) and move the disconnected connection to bottom port 0 of R(2,2) as shown in FIG. 7I. Start bottom port 0 of R(2,2) and top port 1 of R(3,0). Stop diverting the traffic from bottom port 0 of R(2,2) and top port 1 of R(3,0).

The port fifo is now empty. The process continues by loading the port fifo with {top port 0 of R(3,2), bottom port 1 of R(2,1)}.

Figure 7J:
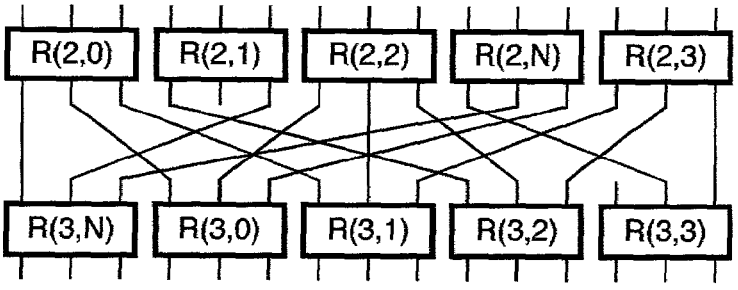

The process continues by selecting top port 0 of R(3,2) because no port top or bottom has a corresponding port that is not connected and, it is the first port in the port fifo. Top port 0 of R(3,2) should be connected to bottom port 0 of R(2,1) according to FIG. 4. Bottom port 0 of R(2,1) is currently connected to top port 0 of R(3,3). Divert traffic from bottom port 0 of R(2,1) and top port 0 of R(3,3). Stop bottom port 0 of R(2,1) and top port 0 of R(3,3). Disconnect bottom port 0 of R(2,1) and top port 0 of R(3,3) and move the disconnected connection to top port 0 of R(3,2) as shown in FIG. 7J. Start top port 0 of R(3,2) and bottom port 0 of R(2,1). Stop diverting the traffic from top port 0 of R(3,2) and bottom port 0 of R(2,1).

Figure 7K:
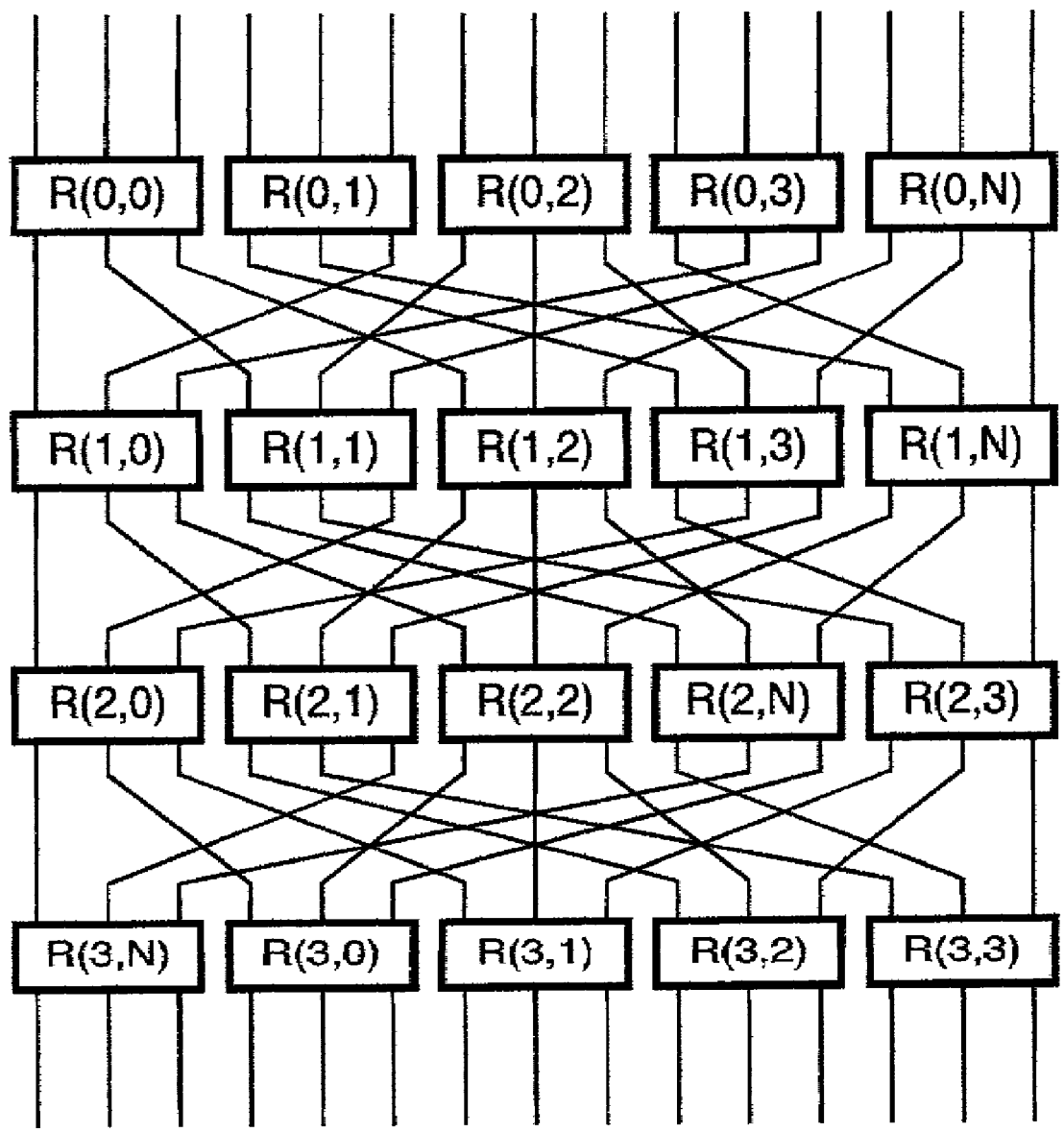
FIG. 7K shows a 30 port RBCCG multistage switching after adding a connection between top port 0 of R(3,3) and bottom port 1 of R(2,1).

The port fifo now contains {bottom port 1 of R(2,1)}. The process continues by selecting bottom port 1 of R(2,1) because no port top or bottom has a corresponding port that is not connected and, it is the first port in the port fifo. Coincidentally, it is also the remaining port left in the port fifo. Bottom port 1 of R(2,1) should be connected to top port 0 of R(3,3) according to FIG. 4. Top port 0 of R(3,3) is currently connected to bottom port 1 of R(2,1). Divert traffic from top port 0 of R(3,3) and bottom port 1 of R(2,1). Stop top port 0 of R(3,3) and bottom port 1 of R(2,1). Disconnect top port 0 of R(3,3) and bottom port 1 of R(2,1) and move the disconnected connection to bottom port 1 of R(2,1) as shown in FIG. 7K. Start bottom port 1 of R(2,1) and top port 0 of R(3,3). Stop diverting the traffic from bottom port 1 of R(2,1) and top port 0 of R(3,3).

This completes the rewiring phase of the width upgrade of the network shown in FIG. 2 in accordance with the insertion positions shown in FIG. 3B all that remains to complete the upgrade is to connect to external sources (if desired) and activate external connections denoted by 45 and 46.

In a more sophisticated system, connections to ports on the same routers may be exchanged logically rather than physically. An example of such a swap is illustrated when interconnection network, 47, of FIG. 3B is transformed into the interconnection network shown in FIG. 8A by sapping bottom port 2 and bottom port 3 of router R(1,0). This may be accomplished logically by permanently diverting the traffic intended for bottom port 2 of router R(1,0) to bottom port 3 of router R(1,0) and the traffic intended for bottom port 3 of router R(1,0) to bottom port 2 of router R(1,0). Even if such a logical exchange is not possible the ports may be in such physical proximity to each other that a physical swap can be made while minimizing the time which the disconnections occur resulting in very little impact on throughput bandwidth. In addition, only port exchanges are used here, but natural extensions to general port permutations may also be employed.

Figure 18:
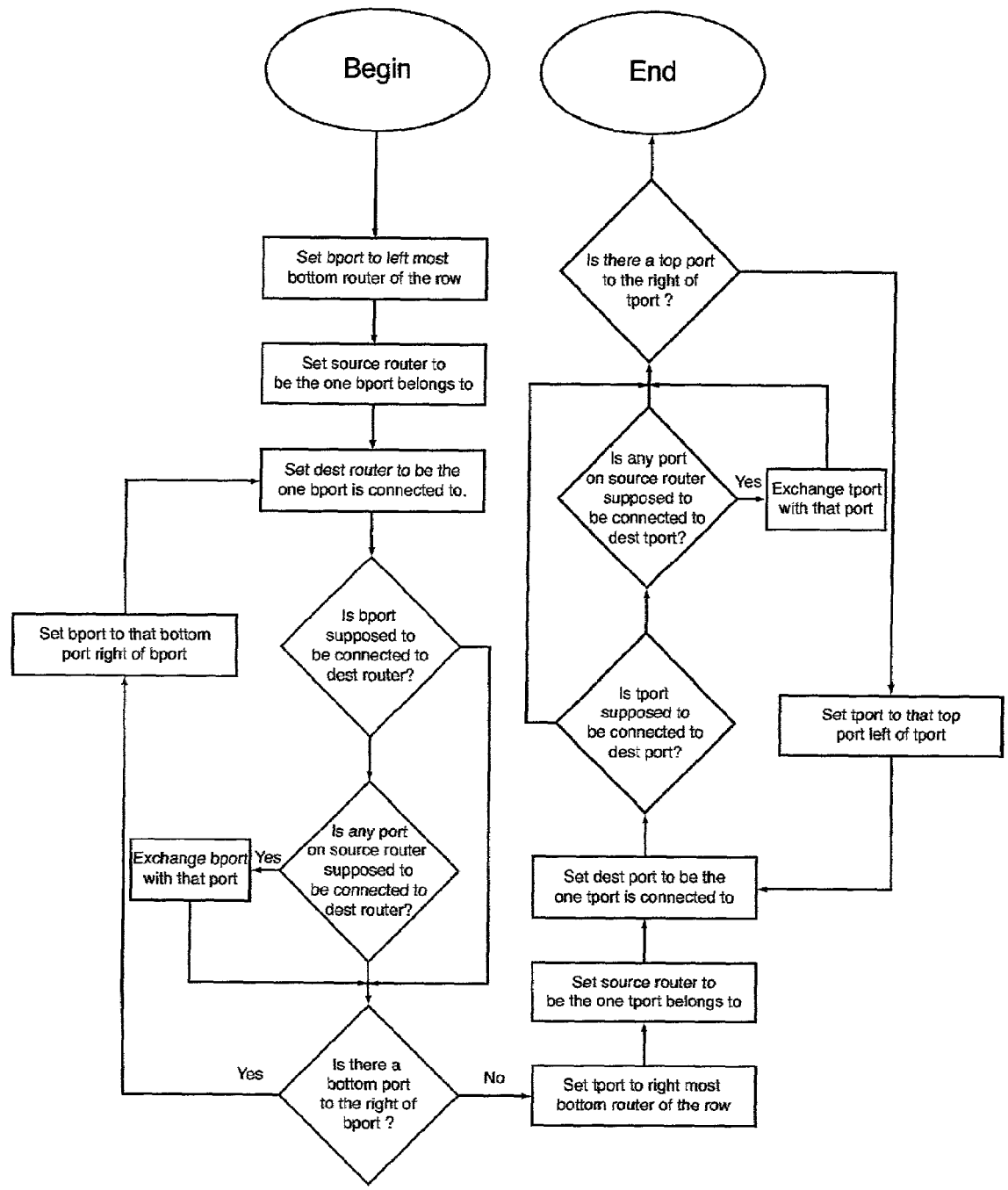
FIG. 18 shows flowchart for the relabeling algorithm shown in FIG. 13.

Rather than show a complete upgrade employing the relabel, for the entire network. The upgrade and rewiring of interconnection network 47 of FIG. 3B (which is the same as interconnection networks 42, 43, 44 of FIG. 3A.) is shown in great detail here. The detail algorithm is given in FIG. 13 and flowcharted FIG. 18.

Figure 8A:
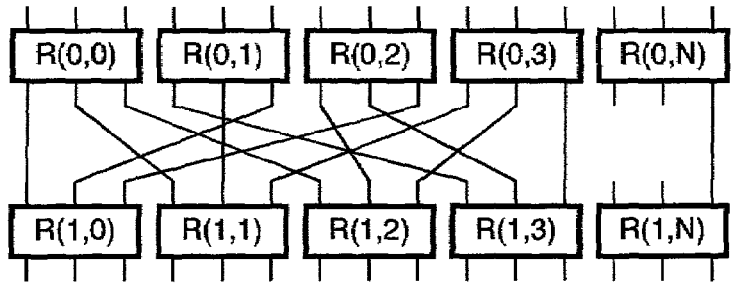
FIG. 8A, FIG. 8B, FIG. 8C, FIG. 8D, FIG. 8E, FIG. 8F, FIG. 8G, FIG. 8H, FIG. 8I, and FIG. 8J show the connections between router rows R(1,*) and R(2,*) an being rewired into a 30 port RBCCG multistage switching network interconnection by an alternate method. First, by swapping bottom ports 1 and 2 of R(0,1); swapping bottom ports 0 and 1 of R(0,2); swapping bottom ports 0 and 2 of R(0,2); and finally, swapping bottom ports 0 and 2 of R(0,3), respectively. Second by moving the connection from bottom port 0 of R(0,3) to bottom port 1 of R(0,N); adding a connection between top port 1 of R(1,N) and bottom port 0 of R(0,3); moving the connection from bottom port 1 of R(0,3) to bottom port 0 of R(0,N); moving the connection from top port 1 of R(1,1) to top port 0 of R(1,N); moving the connection from bottom port 0 of R(0,2) to bottom port 1 of R(0,3); adding a connection between bottom port 0 of R(0,2) and top port 1 of R(1,1), respectively.

The process begins by scanning bottom ports from left to right, R(0,1) is connected to R(1,1), but according to FIG. 4, bottom port 2 should be connected to R(1,1) instead of bottom port 1. The connection to those ports are swapped as shown in FIG. 8A.

The process continues by scanning bottom ports from left to right, R(0,2) is connected to R(1,3), but according to FIG.

Figure 8B:
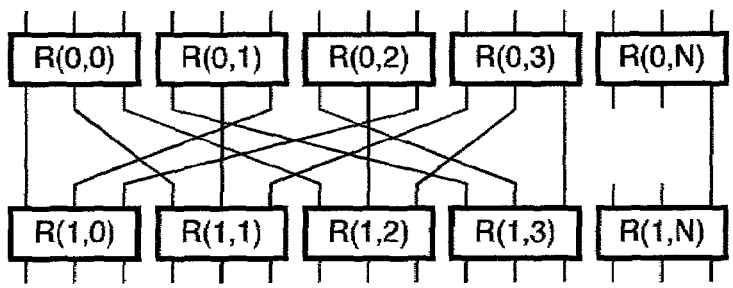

4, bottom port 1 should be connected to R(1,3) instead of bottom port 0. The connection to those ports are swapped as shown in FIG. 8B.

Figure 8C:
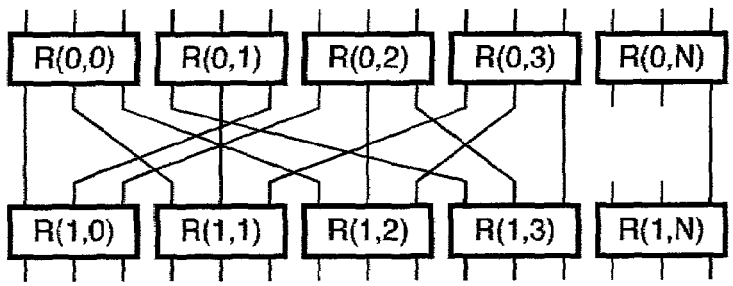

The process continues by scanning bottom ports from left to right, R(0,2) is connected to R(1,0), but according to FIG. 4, bottom port 2 should be connected to R(1,0) instead of bottom port 0. The connection to those ports are swapped as shown in FIG. 8C.

Figure 8D:
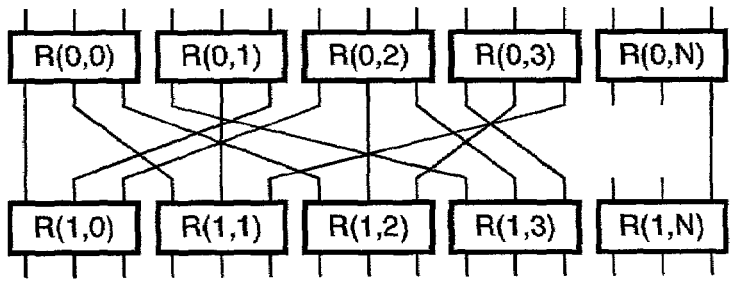

The process continues by scanning bottom ports from left to right, R(0,3) is connected to R(1,3), but according to FIG. 4, bottom port 2 should be connected to R(1,3) instead of bottom port 0. The connection to those ports are swapped as shown in FIG. 8D.

After finishing scanning the bottom ports from left to right, top ports are scanned from right to left. All top ports that are connected to the correct router are connected from the correct top port to the correct bottom port. Hence, the relabeling process is finished. The process continues by employing the same "select_port" algorithm as in FIG. 12B as before.

Scanning from right to left, no port, top or bottom, has a corresponding port which is not connected. Again, scanning from right to left, bottom port 1 of R(0,N) is not connected to anything with corresponding port according to FIG. 4, top port 2 of R(1,3). Top port 2 of R(1,3) is currently connected to bottom port 0 of R(0,3). The breaking of this connection does not leave router R(0,3) or router R(1,3) with more than one broken connection. This completes the selection process for this step.

Figure 8E:
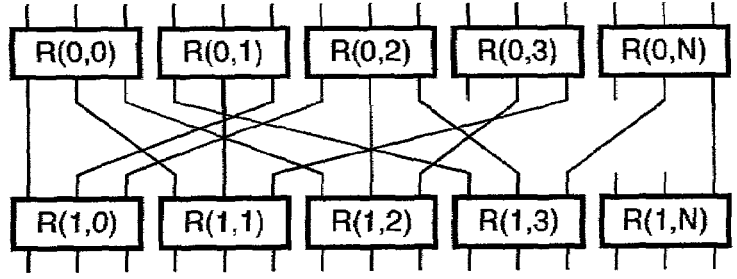

With bottom port 1 of R(0,N) selected and recalling that its corresponding port, top port 2 of R(1,3), is connected to bottom port 0 of R(0,3), the process continues by diverting traffic from top port 2 of R(1,3) and bottom port 0 of R(0,3); stopping top port 2 of R(1,3) and bottom port 0 of R(0,3); disconnecting top port 2 of R(1,3) and bottom port 0 of R(0,3) and moving the disconnected connection to bottom port 1 of R(0,N) as shown in FIG. 8E; starting bottom port 1 of R(0,N) and top port 2 of R(1,3); and stop diverting the traffic from bottom port 1 of R(0,N) and top port 2 of R(1,3).

Figure 8F:
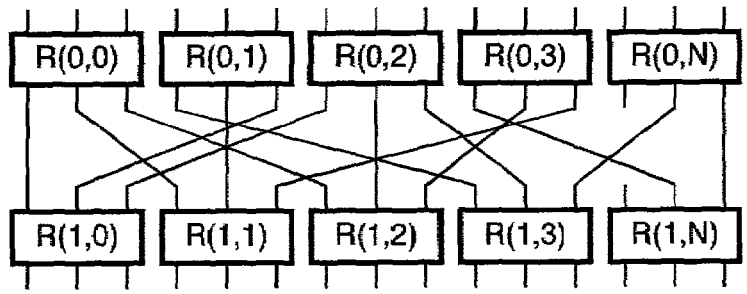

The process continues by selecting top port 1 of R(1,N) because scanning from right to left, it is the first port bottom or top not connected to anything and whose corresponding port (according to FIG. 4) is also not connected to anything; establishing a new connection between top port 1 of R(1,N) and bottom port 0 of R(0,3) as shown in FIG. 8F; starting top port 1 of R(1,N) and bottom port 0 of R(0,3); and stop diverting the traffic from top port 1 of R(1,N) and bottom port 0 of R(0,3).

Scanning from right to left, no port, top or bottom, has a corresponding port which is not connected. Again, scanning from right to left, bottom port 0 of R(0,N) is not connected to anything with corresponding port according to FIG. 4, top port 2 of R(1,2). Top port 2 of R(1,2) is currently connected to bottom port 1 of R(0,3). The breaking of this connection does not leave router R(0,3) or router R(1,2) with more than one broken connection. This completes the selection process for this step.

Figure 8G:
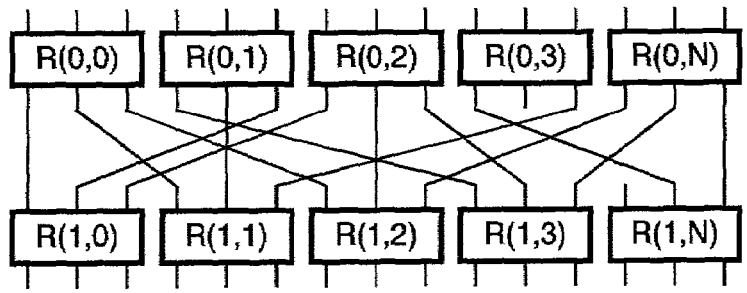

With bottom port 0 of R(0,N) selected and recalling that its corresponding port, top port 2 of R(1,2), is connected to bottom port 1 of R(0,3), the process continues by diverting traffic from top port 2 of R(1,2) and bottom port 1 of R(0,3); stopping top port 2 of R(1,2) and bottom port 1 of R(0,3); disconnecting top port 2 of R(1,2) and bottom port 1 of R(0,3) and moving the disconnected connection to bottom port 0 of R(0,N) as shown in FIG. 8G; starting bottom port 0 of R(0,N) and top port 2 of R(1,2); and stop diverting the traffic from bottom port 0 of R(0,N) and top port 2 of R(1,2).

Scanning from right to left, no port, top or bottom, has a corresponding port which is not connected. Again, scanning from right to left, top port 0 of R(1,N) is not connected to anything with corresponding port according to FIG. 4, bottom port 1 of R(0,1). Bottom port 1 of R(0,1) is currently connected to top port 1 of R(1,1). The breaking of this connection does not leave router R(0,1) or router R(1,1) with more than one broken connection. This completes the selection process for this step.

Figure 8H:
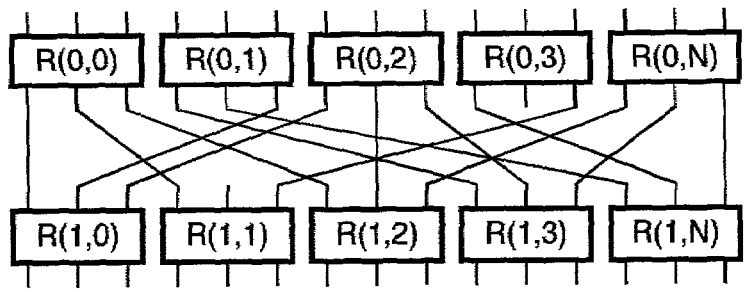

With top port 0 of R(1,N) selected and recalling that its corresponding port, bottom port 1 of R(0,1), is connected to top port 1 of R(1,1), the process continues by diverting traffic from bottom port 1 of R(0,1) and top port 1 of R(1,1); stopping bottom port 1 of R(0,1) and top port 1 of R(1,1); disconnecting bottom port 1 of R(0,1) and top port 1 of R(1,1) and moving the disconnected connection to top port 0 of R(1,N) as shown in FIG. 8H; starting top port 0 of R(1,N) and bottom port 1 of R(0,1); and stop diverting the traffic from top port 0 of R(1,N) and bottom port 1 of R(0,1).

Scanning from right to left, no port, top or bottom, has a corresponding port which is not connected. Again, scanning from right to left, bottom port 1 of R(0,3) is not connected to anything with corresponding port according to FIG. 4, top port 2 of R(1,0). Top port 2 of R(1,0) is currently connected to bottom port 0 of R(0,2). The breaking of this connection does not leave router R(0,2) or router R(1,0) with more than one broken connection. This completes the selection process for this step.

Figure 8I:
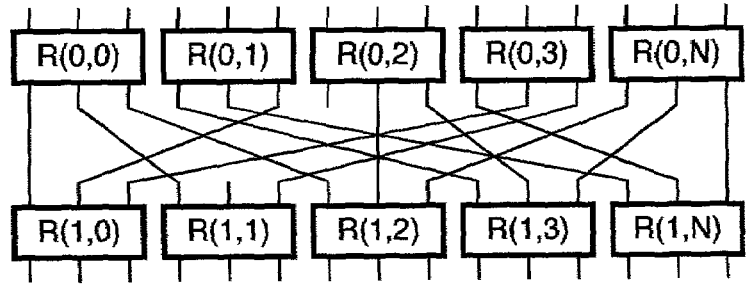

With bottom port 1 of R(0,3) selected and recalling that its corresponding port, top port 2 of R(1,0), is connected to bottom port 0 of R(0,2), the process continues by diverting traffic from top port 2 of R(1,0) and bottom port 0 of R(0,2); stopping top port 2 of R(1,0) and bottom port 0 of R(0,2); disconnecting top port 2 of R(1,0) and bottom port 0 of R(0,2) and moving the disconnected connection to bottom port 1 of R(0,3) as shown in FIG. 8I; starting bottom port 1 of R(0,3) and top port 2 of R(1,0); and stop diverting the traffic from bottom port 1 of R(0,3) and top port 2 of R(1,0).

Figure 8J:
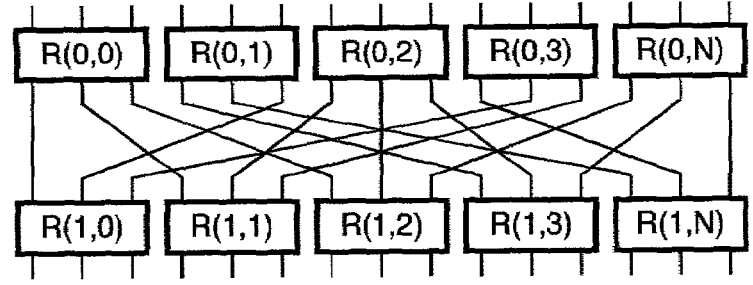

The process continues by selecting bottom port 0 of R(0,2) because scanning from right to left, it is the first port bottom or top not connected to anything and whose corresponding port (according to FIG. 4) is also not connected to anything; establishing a new connection between bottom port 0 of R(0,2) and top port 1 of R(1,1) as shown in FIG. 8J; starting bottom port 0 of R(0,2) and top port 1 of R(1,1); and stop diverting the traffic from bottom port 0 of R(0,2) and top port 1 of R(1,1).

This completes the relabel and rewire phase applied to interconnection network, 47, of FIG. 3B. In a complete upgrade, this algorithm could first be applied to interconnection network, 48, of FIG. 3B, then interconnection network, 47, of FIG. 3B, and finally interconnection network, 49, of FIG. 3B in accordance with the first "row_select" algorithm of FIG. 11. Again to complete the upgrade external connections, 45 and 46 should be connected to external sources and activated.

Though the example focused in this application is illustrated in FIG. 3B, it has been found that the best upgrade algorithm found employs the first "insertion_position" algorithm of FIG. 10 and shown in FIG. 3A; uses the row order dictated by the first "row_select" algorithm of FIG. 11; and on each interconnection network selected by the above row order, optionally uses the "relabel" algorithm given in FIG. 13, and the "select_port" algorithm of FIG. 12B.

In the two other examples depicted in FIG. 3A and FIG. 3C, after the rewire (and relabel) phase using the components of choice. The upgrade is completed by connecting and activating external connections, 40 and 41, for the example in FIG. 3A or 50 and 51, for the example in FIG. 3C.

The process depicted in application may be used also to reduce the width of the network. Simply reverse the process shown here. In summary, the process would involve disconnecting external connections to routers to be removed; rewiring each interconnection network in the same manner as those described above; and finally removing the unwired routers.

Though this invention is applied to a RBCCG network composed of rows of routers of consistent number per row and fanout per router. It may be applied to fault tolerant networks composed of rows of routers of varying number per row and fanout per router where the rows are connected with interconnection networks of the same type as that used in a RBCCG network It also applies to any redundant multistage network for which a width augmentation is defined. In addition, it is not restricted to routers and may be applied to networks composed of other types of switching elements.

Although the present invention has been described above in terms of specific embodiments, it is anticipated that alteration and modifications thereof will no doubt become apparent to those skilled in the art. It is therefore intended that the following claims be interpreted as covering all such alterations and modifications as falling within the true spirit and scope of the invention.

I claim:

1. A method of increasing the width of a redundant multi-stage network comprising a plurality of rows, having a first row and a last row, each row comprises a plurality of routers, each router comprises a plurality of ports, said plurality of ports comprises top ports and bottom ports, each port comprises a label, wherein the top ports of the first row and the bottom ports of the last row are connected to external sources, comprising the steps of:

providing a topology where the topology specifies for each port of each router of each row a corresponding port of a corresponding router to be connected, if said corresponding port exists;

inserting into each row a new router into a selected position within the row, wherein the new router comprises a plurality of top ports and bottom ports;

a) either rewiring a selected port to be connected to the corresponding port of the corresponding router for said selected port or permuting the labels of two or more ports of a selected router to reduce the number of ports which have to be rewired, wherein the selected port is any port having a corresponding port of a corresponding router and is not connected to said corresponding port;

repeating step a) until all the ports that have a corresponding port of the corresponding router are connected to said corresponding port;

connecting the top ports of the new router in the first row to external sources;

connecting the bottom ports of the new router in last row to external sources;

activating the top ports of the new router in the first row; and activating the bottom ports of the new router in the last row.

2. The method of claim 1, wherein the step a) is rewiring a selected port to be connected the corresponding port of the corresponding router for the selected port, wherein the selected port is any port having a corresponding port of a corresponding router and is not connected to said corresponding port.

3. The method of claim 1, wherein the rewiring a selected port comprises the steps of:

disconnecting any connection connected to the selected port;

disconnecting any connection connected to the corresponding port of the corresponding router for the selected port; and connecting a connection between the selected port and the corresponding port.

4. The method of claim 1, wherein the rewiring a selected port comprises the steps of:

deactivating the selected port;

disconnecting any connection connected to the selected port;

deactivating the corresponding port of the corresponding router for the selected port;

disconnecting any connection connected to the corresponding;

connecting a connection between the selected port and the corresponding port;

activating the selected port; and activating the corresponding port.

5. The method of claim 1, wherein the selection position within each row of the plurality of rows is the same thereby forming a column of new routers within the redundant multi-stage network.

6. A method of increasing the width of a redundant multi-stage network comprising a plurality of rows, having a first row and a last row, each row comprises a plurality of routers, each router comprises a plurality of ports, said plurality of ports comprises top ports and bottom ports, each port comprises a label, wherein the top ports of the first row and the bottom ports of the last row are connected to external sources, comprising the steps of:

providing a topology where the topology specifies for each port of each router of each row a corresponding port of a corresponding router to be connected, if said corresponding port exists;

inserting into each row a new router into a selected position with the row, wherein the new router comprises a plurality of top ports and bottom ports;

a) selecting a selected row from all previously unselected rows from a row collection wherein the row collection comprises all rows except the last row from the plurality of rows, wherein the selected row is connected to an adjacent row below the selected row by an interconnection network where bottom ports of routers in the selected row are connected to top ports of routers in the adjacent row;

b) performing an iteration comprising the steps of:

c) selecting a selected port from a port pool comprising all bottom ports of all routers in the selected row and all top ports of all routers of the adjacent row that have a corresponding port and are not connected to said corresponding port;

d) rewiring the selected port to be connected the corresponding port of the corresponding router for said selected port; and repeating the steps c) and d) until all bottom ports of routers in the selected row and all top ports of routers in the adjacent row that have a corresponding port of a corresponding router are connected to said corresponding port;

repeating steps a) and b) until all rows in the row collection have been selected;

connecting the top ports of the new router in the first row to external sources;
connecting the bottom ports of the new router in last row to external sources;
activating the top ports of the new router in the first row; and
activating the bottom ports of the new router in the last row.

7. The method of claim 6, wherein step d) comprises the steps of:
disconnecting any connection connected to the selected port;
disconnecting any connection connected to the corresponding port of the corresponding router for the selected port and;
connecting a connection between the selected port and the corresponding port.

8. The method of claim 6, wherein step d) comprises the steps of:
deactivating the selected port;
disconnecting any connection connected to the selected port;
deactivating the corresponding port of the corresponding router for the selected port;
disconnecting any connection connected to the corresponding port;
connecting a connection between the selected port and the corresponding port;
activating the selected port; and
activating the corresponding port.

9. The method of claim 6 wherein step a) comprises the step of:
picking as the selected row, a row within the row collection which is closest to the middle of the redundant multi-stage network and previously unselected.

10. The method of claim 6 wherein the iteration further comprises the steps of:
e) selecting a selected router in the selected row having a first bottom port and a second bottom port in the plurality of bottom ports, wherein the first bottom port is connected to any port of the corresponding router for the second bottom port;
f) exchanging the label of the first bottom port and label of the second bottom port; and
repeating steps e) and f) until there are no routers having a first bottom port and a second bottom port, wherein the first bottom port is connected to any port of the corresponding router for the second bottom port.

11. The method of claim 10, wherein the iteration further comprises the steps of:
g) selecting a selected router in the adjacent row having a first top port and a second top port in the plurality of top ports, wherein the first top port is connected to the corresponding port of the corresponding router for the second top port;
h) exchanging the label of the first bottom port and label of the second bottom port; and
repeating steps g) and h) until there are no routers having a first bottom port and a second bottom port, wherein the first bottom port is connected to the corresponding port of the corresponding router for the second bottom port.

12. The method of claim 6 wherein step c) comprises the step of:
if a disconnected port exists in the port pool, selecting said disconnected port as the selected port.

13. The method of claim 6 wherein step c) comprises the step of:
if a disconnected port exists in the port pool, wherein the corresponding port of the corresponding router for the disconnected port is not connected, selecting said disconnected port as the selected port.

14. The method of claim 6 wherein step c) comprises the step of:
if a disconnected port exists in the port pool, wherein all ports of a router connected to the corresponding port of the corresponding router for the disconnected port are connected, selecting said disconnected port as the selected port.

15. The method of claim 6 wherein step c) comprises the steps of:
e) if a first disconnected port exists in the port pool, selecting said first disconnected port as the selected port, wherein the corresponding port of the corresponding router for the first disconnected port is not connected;
f) if no port was selected as the port in step e) and a second disconnected port exists in the port pool, selecting said second disconnected port as the selected port, wherein all ports of a router connected to the corresponding port of the corresponding router for the second disconnected port are connected;
g) if no port was selected as the selected port in step e) or f) and if a third disconnected port exists in the port pool, selecting said third disconnected port as the selected port, wherein the third disconnected port is not connected; and
if no port was selected as the selected port in step e), f) or g) selecting any port in the port pool as the selected port.

16. The method of claim 6 wherein step c) comprises the steps of:
if a previously disconnected port exists in the port pool, selecting said previously disconnected port as the selected port, otherwise picking any port in the port pool as the selected port, wherein the previously disconnected port was disconnected in a previous iteration of step c).

17. The method of claim 6 further comprising the steps of:
providing a port fifo, and wherein step c) comprises the steps of:
e) if the port fifo is empty, adding to the port fifo all ports in the port pool which are not connected;
f) if no ports are added to the port fifo in step e), selecting as the selected port any port in the port pool;
if no port was selected as the selected port in step f), selecting as the selected port, a next port in the port fifo.

18. A method of decreasing the width of a redundant multi-stage network comprising a plurality of rows, having a first row and a last row, each row comprises a plurality of routers, each router comprises a plurality of ports, said plurality of ports comprises top ports and bottom ports, each port comprises a label, wherein the top ports of the first row and the bottom ports of the last row are connected to external sources, comprising the steps of:
providing a topology where the topology specifies for each port of each router of each row a corresponding port of a corresponding router to be connected, if said corresponding port exists;
selecting a selected router in each row to be removed;
deactivating the top ports of the selected router in the first row;

deactivating the bottom ports of the selected router in the last row;

disconnecting the top ports of the selected router in the first row from external sources;

disconnecting the bottom ports of the selected router in last row from external sources;

a) either rewiring a selected port to be connected to the corresponding port of the corresponding router for said selected port or permuting the labels of two or more ports of a selected router to reduce the number of ports which have to be rewired, wherein the selected port is any port having a corresponding port of a corresponding router and is not connected to said corresponding port;

repeating step a) until all the ports that have a corresponding port of the corresponding router are connected to said corresponding port; and removing the selected routers from each row.

19. The method of claim 18, wherein the step a) is rewiring a selected port to be connected the corresponding port of the corresponding router for the selected port, wherein the selected port is any port having a corresponding port of a corresponding router, said selected port and is not connected to said corresponding port.

20. A method of decreasing the width of a redundant multi-stage network comprising a plurality of rows, having a first row and a last row, each row comprises a plurality of routers, each router comprises a plurality of ports, said plurality of ports comprises top ports and bottom ports, each port comprises a label, wherein the top ports of the first row and the bottom ports of the last row are connected to external sources, comprising the steps of:

providing a topology where the topology specifies for each port of each router of each row a corresponding port of a corresponding router to be connected, if said corresponding port exists;

selecting a selected router in each row to be removed;

deactivating the top ports of the selected router in the first row;

deactivating the bottom ports of the selected router in the last row;

disconnecting the top ports of the selected router in the first row from external sources;

disconnecting the bottom ports of the selected router in last row from external sources;

a) selecting a selected row from all previously unselected row from a row collection wherein the row collection comprises all rows except the last row from the plurality of rows, wherein the selected row is connected to an adjacent row below the selected row by an interconnection network where bottom ports of routers in the selected row are connected to top ports of routers in the adjacent row;

b) performing an iteration comprising the steps of:

c) selecting a selected port from a port pool comprising all bottom ports of all routers in the selected row and all top ports of all routers of the adjacent row that have a corresponding port of a corresponding port and are not connected to said corresponding port;

d) rewiring the selected port to be connected the corresponding port of the corresponding router for said selected port; and repeating the steps c) and d) until all bottom ports of routers in the selected row and all top ports of routers in the adjacent row that have a corresponding port of a corresponding router are connected to the corresponding port;

repeating steps a)–b) until all rows in the for row collection have been selected; and removing the selected routers from each row.

21. The method of claim 20, wherein the iteration further comprises the steps of:

e) selecting a selected router in the selected row having a first bottom port and a second bottom port in the plurality of bottom ports, wherein the first bottom port is connected to any port of the corresponding router for the second bottom port;

f) exchanging the label of the first bottom port and label of the second bottom port;

repeating steps e) and f) until there are no routers having a first bottom port and a second bottom port, wherein the first bottom port is connected to any port of the corresponding router for the second bottom port;

g) selecting a selected router in the adjacent row having a first top port and a second top port in the plurality of top ports, wherein the first top port is connected to the corresponding port of the corresponding router for the second top port;

h) exchanging the label of the first bottom port and label of the second bottom port; and repeating steps g) and h) until there are no routers having a first bottom port and a second bottom port, wherein the first bottom port is connected to the corresponding port of the corresponding router for the second bottom port.

* * * * *